(12) United States Patent
Kubo et al.

(10) Patent No.: US 7,292,301 B2
(45) Date of Patent: *Nov. 6, 2007

(54) LIQUID CRYSTAL DISPLAY DEVICE AND DRIVING METHOD FOR THE SAME

(75) Inventors: Masumi Kubo, Ikoma (JP); Akihiro Yamamoto, Yamatokoriyama (JP); Hiroyuki Ohgami, Shiki-gun (JP); Takashi Ochi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 235 days.

This patent is subject to a terminal disclaimer.

(21) Appl. No.: 10/898,688

(22) Filed: Jul. 26, 2004

(65) Prior Publication Data

US 2005/0024546 A1 Feb. 3, 2005

(30) Foreign Application Priority Data

Jul. 24, 2003 (JP) ............................ 2003-279083
Jul. 12, 2004 (JP) ............................ 2004-205103

(51) Int. Cl.
*G02F 1/1337* (2006.01)

(52) U.S. Cl. ...................................... 349/129; 349/130

(58) Field of Classification Search ................ 349/123, 349/130, 128, 129, 191
See application file for complete search history.

(56) References Cited

U.S. PATENT DOCUMENTS

| 6,424,398 | B1 | 7/2002 | Taniguchi | |
|---|---|---|---|---|
| 6,567,144 | B1* | 5/2003 | Kim et al. | 349/128 |
| 6,661,488 | B1 | 12/2003 | Takeda et al. | |
| 6,952,192 | B2 | 10/2005 | Ohmuro et al. | |
| 6,977,704 | B2* | 12/2005 | Kataoka | 349/130 |
| 7,064,801 | B2* | 6/2006 | Kubo et al. | 349/129 |
| 2001/0040546 | A1 | 11/2001 | Ohmuro et al. | |
| 2002/0159018 | A1 | 10/2002 | Kataoka et al. | |

FOREIGN PATENT DOCUMENTS

WO WO 2004/010212 1/2004

* cited by examiner

*Primary Examiner*—Thoi V. Duong
(74) *Attorney, Agent, or Firm*—Nixon & Vanderhye P.C.

(57) ABSTRACT

An alignment-divided vertical alignment liquid crystal display device permitting high-definition moving image display when OS driving is adopted. The device has a plurality of pixels each having a first electrode, a second electrode facing the first electrode, and a vertical alignment liquid crystal layer placed between the first and second electrodes. The device includes: first alignment regulating structure having a first width W1 placed in the first electrode side of the liquid crystal layer; second alignment regulating structure having a second width placed in the second electrode side of the liquid crystal layer; and a liquid crystal region having a third width defined between the first and second alignment regulating structures. The third width W3 is in a range between 2 μm and 14 μm in certain embodiments.

27 Claims, 20 Drawing Sheets

LIQUID CRYSTAL DISPLAY DEVICE AND DRIVING METHOD FOR THE SAME

BACKGROUND OF THE INVENTION

The present invention relates to a liquid crystal display device and a driving method for the same, and more particularly, relates to a liquid crystal display device suitably used for display of moving images and a driving method for the same.

In recent years, liquid crystal display devices (LCDs) have increasingly come into widespread use. Among various types of LCDs, mainstream has been a TN LCD in which a nematic liquid crystal material having positive dielectric anisotropy is twisted. The TN LCD however has a problem of being large in visual angle dependence that results from the alignment of liquid crystal molecules.

To improve the visual angle dependence, alignment-divided vertical alignment LCDs have been developed, and use of these LCDs is expanding. For example, Japanese Patent Gazette No. 2947350 (Literature 1) discloses an MVA LCD as one of the alignment-divided vertical alignment LCDs. The MVA LCD, which includes a vertical alignment liquid crystal layer placed between a pair of electrodes to present display in the normally black (NB) mode, is provided with domain regulating means (for example, slits and/or protrusions) to enable liquid crystal molecules in each pixel to fall (tilt) in a plurality of different directions during application of a voltage.

Recently, needs for displaying moving image information have rapidly increased, not only in LCD TVs, but also in PC monitors and portable terminal equipment (such as mobile phones and PDAs). To display moving images with high definition on LCDs, it is necessary to shorten the response time (increase the response speed) of the liquid crystal layer, so that a predetermined grayscale level can be reached within one vertical scanning period (typically, one frame).

As for the MVA LCD, Literature 1 mentioned above, for example, discloses that the black-to-white response time can be shortened to 10 msec or less. Literature 1 also describes that regions different in the distance between protrusions are provided in each pixel to give regions different in response speed, to thereby attain improvement in apparent response speed without reducing the aperture ratio (see FIGS. 107 to 110 of Literature 1, for example).

As a driving method that can improve the response characteristic of LCDs, known is a method in which a voltage higher than a voltage (grayscale voltage) corresponding to the grayscale level to be displayed (this voltage is called an "overshoot (OS) voltage") is applied (this method is called "overshoot (OS) driving"). With application of an OS voltage, the response characteristic in grayscale display can be improved. For example, Japanese Laid-Open Patent Publication No. 2000-231091 (Literature 2) discloses an MVA LCD adopting the OS driving. Literature 2 however describes that an OS voltage should not be applied when a shift is made from the black display state to a high-luminance grayscale display state (see FIG. 8 of Literature 2). The reason is described as that the transmittance will be overshot if an OS voltage (e.g., voltage 1.25 times as high as that for giving the target transmittance) is applied at a shift from the black display state to a high-luminance grayscale display state as is applied at a shift from the black display state to a low-luminance grayscale display state or to the white display state.

However, as a result of examinations done by the inventors of the present invention, it has been found that a new problem arises when the OS driving is adopted for alignment-divided vertical alignment LCDs such as the MVA LCD described above. This problem will be described with reference to FIGS. 20A and 20B.

FIGS. 20A and 20B are views diagrammatically showing the state of display observed when a square 92 of a certain grayscale level (for example, level 32/255) is moved in a black background 90 (for example, level 0), in the cases of driving a conventional MVA LCD by a normal driving method (FIG. 20A) and driving the same by the OS driving (FIG. 20B). Note that the "level 32/255" is a grayscale level giving a luminance of $(32/255)^{2.2}$ with respect to the luminance in black display (during application of V0) as 0 and the luminance in white display (during application of V255) as 1 when the grayscale display is set as $\gamma^{2.2}$. The grayscale voltage giving this luminance is denoted by V32.

When no OS driving is adopted, the response speed of the alignment-divided vertical alignment LCD is low. Therefore, as diagrammatically shown in FIG. 20A, a left edge 92a of the square 92 located downstream of the moving direction may not be observed clearly in some cases. When the OS driving is adopted, the response speed is improved, and thus as diagrammatically shown in FIG. 20B, the edge 92a is observed clearly. However, a new phenomenon arises in some cases, in which a dark belt 92b is observed at a position of the square a little apart from the edge 92a.

The present inventors have examined the cause of the above problem in various ways, and found that the above phenomenon is a new problem that has never occurred as long as the OS driving is adopted for conventional TN LCDs, and results from the alignment division done with the alignment regulating means (domain regulating means) placed linearly (in a stripe shape) in each pixel in alignment-divided vertical alignment LCDS.

In view of the above, a main object of the present invention is providing an alignment-divided vertical alignment LCD permitting high-definition moving image display.

SUMMARY OF THE INVENTION

The liquid crystal display device according to one aspect of the present invention has a plurality or an array of pixels each having a first electrode, a second electrode facing the first electrode, and a vertical alignment liquid crystal layer placed between the first and second electrodes, the device including: first alignment regulating means having a first width placed in the first electrode side of the liquid crystal layer; second alignment regulating means having a second width placed in the second electrode side of the liquid crystal layer; and a liquid crystal region having a third width defined between the first alignment regulating means and the second alignment regulating means, wherein the third width is in a range between 2 μm and 14 μm.

In one embodiment, the first alignment regulating means is in a stripe shape having the first width, the second alignment regulating means is in a stripe shape having the second width, and the liquid crystal region is in a stripe shape having the third width.

In another embodiment, the third width is preferably 12 μm or less, and more preferably 8 μm or less.

The liquid crystal display device according to another aspect of the present invention has a plurality of pixels each having a first electrode, a second electrode facing the first electrode, and a vertical alignment liquid crystal layer placed between the first and second electrodes, the device including: first alignment regulating means having a first width placed in the first electrode side of the liquid crystal layer;

second alignment regulating means having a second width placed in the second electrode side of the liquid crystal layer; and a liquid crystal region having a third width defined between the first alignment regulating means and the second alignment regulating means, wherein the liquid crystal region includes: a first liquid crystal portion having a first response speed located adjacent to the first alignment regulating means; a second liquid crystal portion having a second response speed located adjacent to the second alignment regulating means; and a third liquid crystal portion having a third response speed lower than the first and second response speeds, the third liquid crystal portion being defined between the first liquid crystal portion and the second liquid crystal portion, and in the third liquid crystal portion, the width of a portion in which a transmittance reached after a lapse of a time corresponding to one vertical scanning period from application of a voltage is twice or less of a transmittance in the black display state is 2 µm or less, the voltage applied being high enough to allow the transmittance to reach a transmittance value of a grayscale level 32/255 from the black display state within one vertical scanning period.

In one embodiment, the first alignment regulating means is in a stripe shape having the first width, the second alignment regulating means is in a stripe shape having the second width, and the liquid crystal region is in a stripe shape having the third width.

In another embodiment, one vertical scanning period is 16.7 msec.

In yet another embodiment, the third width is preferably in a range between 2 µm and 14 µm, more preferably 12 µm or less, and further more preferably 8 µm or less.

In yet another embodiment, the first alignment regulating means is a rib, and the second alignment regulating means is a slit formed through the second electrode.

In yet another embodiment, the first width is in a range between 4 µm and 20 µm, and the second width is in a range between 4 µm and 20 µm.

In yet another embodiment, the first electrode is a counter electrode, and the second electrode is a pixel electrode.

In yet another embodiment, the thickness of the liquid crystal layer is less than 3 µm.

In yet another embodiment, the second width/thickness of the liquid crystal layer is 3 or more.

In yet another embodiment, the third width/second width is 1.5 or less.

In yet another embodiment, the device has a pair of polarizing plates placed to face each other with the liquid crystal layer therebetween, transmission axes of the pair of polarizing plates are orthogonal to each other, one of the transmission axes extends in a horizontal direction in the display plane, and the first and second alignment regulating means are placed to extend in a direction about 45° from the one of the transmission axes.

In yet another embodiment, the device further includes a drive circuit capable of applying an overshoot voltage higher than a grayscale voltage determined in advance to correspond to a predetermined grayscale.

The liquid crystal display device according to yet another aspect of the present invention has a plurality of pixels each having a first electrode, a second electrode facing the first electrode, and a vertical alignment liquid crystal layer placed between the first and second electrodes, the device including: stripe-shaped first alignment regulating means having a first width placed in the first electrode side of the liquid crystal layer; stripe-shaped second alignment regulating means having a second width placed in the second electrode side of the liquid crystal layer; and a stripe-shaped liquid crystal region having a third width defined between the first alignment regulating means and the second alignment regulating means, wherein the third width is in a range between 2 µm and 14 µm, and the thickness of the liquid crystal layer is less than 3 µm.

The driving method of an example embodiment of the present invention is a driving method for the liquid crystal display device described above, including the step of applying an overshoot voltage in display of a given grayscale level higher than a grayscale level displayed in the preceding vertical scanning period, the overshoot voltage being higher than a predetermined grayscale voltage corresponding to the given and/or desired grayscale level.

In one embodiment, the overshoot voltage is set so that the display luminance reaches a predetermined value corresponding to the given (or desired) grayscale level within a time corresponding to one vertical scanning period.

The electronic equipment of an example embodiment of the present invention includes the liquid crystal display device described above.

In one embodiment, the electronic equipment further includes a circuit for receiving television broadcast.

According to an example embodiment of the present invention, an alignment-divided vertical alignment LCD that can present high-definition moving image display when OS driving is adopted is provided. The LCD of an example embodiment of the present invention is suitably usable as an LCD TV by being provided with a circuit for receiving television broadcast (e.g., via satellite, cable, and/or electromagnetic waves, etc.). Also, the LCD of example embodiments of the present invention is suitably applicable to electronic equipment used for display of moving images, such as personal computers and PDAs.

DETAILED DESCRIPTION OF THE INVENTION

Figure 1A:
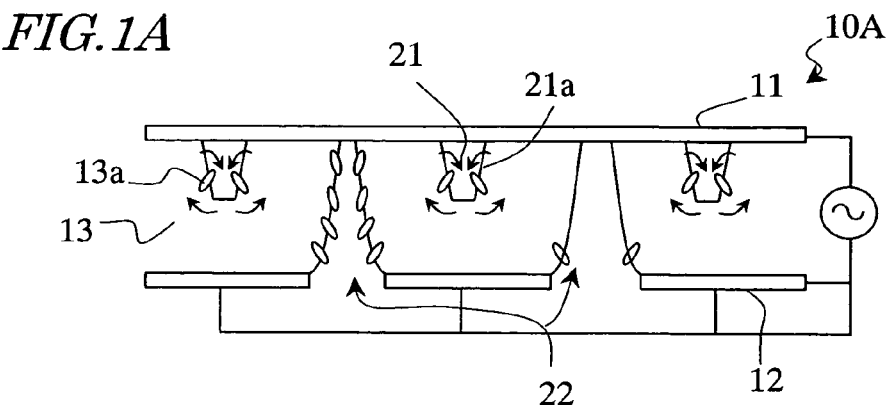
FIGS. 1A, 1B and 1C are cross-sectional views diagrammatically showing basic configurations of MVA LCDs of embodiments of the present invention.

Hereinafter, LCDs of example embodiments of the present invention and driving methods for the LCDs will be described with reference to the relevant drawings.

First, basic configurations of alignment-divided vertical alignment LCDs of example embodiments of the present invention will be described with reference to FIGS. 1A to 1C.

The LCDs of the example embodiments of the present invention include a plurality of pixels each having a first electrode 11, a second electrode 12 facing the first electrode 11, and a vertical alignment liquid crystal layer 13 placed between the first electrode 11 and the second electrode 12. The vertical alignment liquid crystal layer 13 includes liquid crystal molecules having negative dielectric anisotropy that are aligned roughly vertically (for example, at an angle in the range between 87° and 90°) with respect to the plane of the first and second electrodes 11 and 12 during non-voltage application (or voltage application below the threshold voltage). Typically, this alignment is attained by providing a vertical alignment film (not shown) on each of the surfaces of the first and second electrodes 11 and 12 facing the liquid crystal layer 13. Ribs (or protrusions) and/or the like may be provided as alignment regulating means. In this case, liquid crystal molecules are aligned to be roughly vertically with respect to the surfaces of the ribs and the like facing the liquid crystal layer since the vertical alignment film is also provided over the ribs or protrusions.

First alignment regulating means (21, 31, 41) (protrusions 21, 31, or slits/apertures 41 in electrodes) are provided in the first electrode 11 side of the liquid crystal layer 13, while second alignment regulating means (22, 32, 42) (protrusions 32, or slits/apertures 22, 42) are provided in the second electrode 12 side of the liquid crystal layer 13. In each of liquid crystal regions defined between the first and second alignment regulating means, liquid crystal molecules 13a are under alignment regulating force applied from the first and second alignment regulating means. Once a voltage above a threshold voltage is applied between the first and second electrodes 11 and 12, the liquid crystal molecules 13a fall (tilt) in the directions shown by the arrows in FIGS. 1A to 1C. That is, in each of the liquid crystal regions between regulating means, liquid crystal molecules fall in a uniform direction. Such liquid crystal regions therefore can be regarded as domains. Note that the alignment regulating means as used in certain example embodiments herein correspond to the domain regulating means described in Literature 1 and 2 mentioned above.

The first alignment regulating means and the second alignment regulating means (hereinafter, these may be collectively called "alignment regulating means" in some cases) are placed in a stripe shape in each pixel. FIGS. 1A to 1C are cross-sectional views taken orthogonal to the extension of the stripe-shaped alignment regulating means. Liquid crystal regions (domains) in which liquid crystal molecules 13a fall in directions different by approximately 180° from each other are formed on both sides of each alignment regulating means.

Specifically, an LCD 10A shown in FIG. 1A has ribs (or elongated protrusions) 21 as the first alignment regulating means and slits (or apertures/openings) 22 formed through the second electrode 12 as the second alignment regulating means. The ribs 21 and the slits 22 extend in a stripe shape. The ribs 21 serve to align liquid crystal molecules 13a roughly vertically with respect to the side faces of the ribs 21, so that the liquid crystal molecules 13a are aligned in a direction orthogonal to the extension of the ribs 21. The slits 22 serve to generate a tilt electric field in areas of the liquid crystal layer 13 near the edges of the slits 22 when a potential difference is given between the first and second electrodes 11 and 12, so that the liquid crystal molecules 13a are aligned in a direction orthogonal to the extension of the slits 22. The ribs 21 and the slits 22 are placed in parallel with each other with a predetermined spacing therebetween, and liquid crystal regions (domains) are formed between the ribs 21 and the slits 22 adjacent to each other.

Figure 1B:
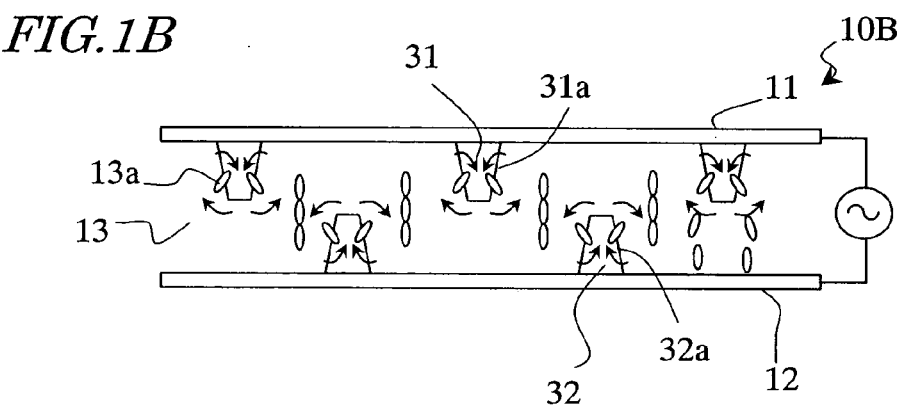

An LCD 10B shown in FIG. 1B is different from the LCD 10A shown in FIG. 1A in that ribs 31 and 32 are provided as the first and second alignment regulating means, respectively. The ribs 31 and 32 are placed in parallel with each other with a predetermined spacing therebetween, and serve to align liquid crystal molecules 13a roughly vertically with respect to side faces 31a of the ribs 31 and side faces 32a of the ribs 32, to thereby form liquid crystal regions (domains) between these ribs.

Figure 1C:
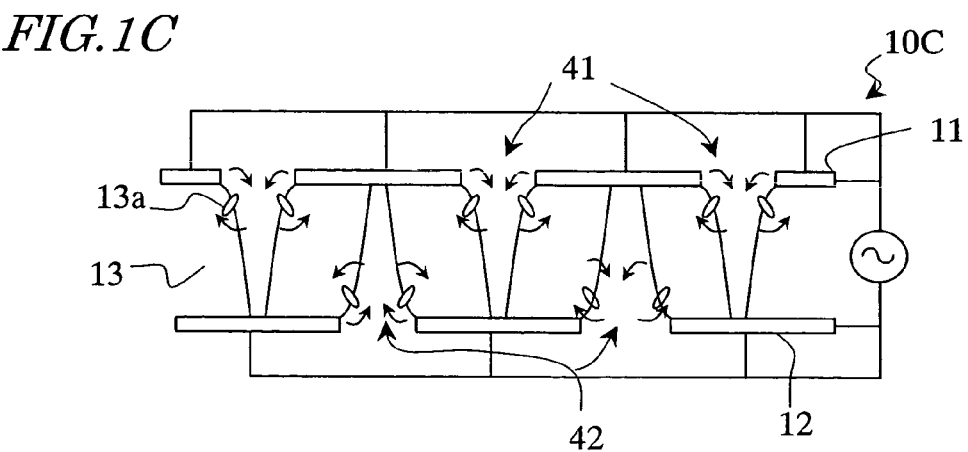

An LCD 10C shown in FIG. 1C is different from the LCD 10A shown in FIG. 1A in that slits 41 and 42 are provided as the first and second alignment regulating means, respectively. The slits 41 and 42 serve to generate a tilt electric field in areas of the liquid crystal layer 13 near the edges of the slits 41 and 42 when a potential difference is given between the first and second electrodes 11 and 12, so that liquid crystal molecules 13a are aligned in a direction orthogonal to the extension of the slits 41 and 42. The slits 41 and 42 are placed in parallel with each other with a predetermined spacing therebetween, and liquid crystal regions (domains) are formed between these slits.

As described above, an arbitrary combination of ribs and/or slits can be used as the first and second alignment regulating means. The first and second electrodes 11 and 12 may be electrodes facing each other with the liquid crystal layer 13 therebetween. Typically, one electrode is a counter electrode, and the other is a pixel electrode. Hereinafter, an embodiment of the present invention will be described taking, as an example, an LCD having a counter electrode as the first electrode 11, a pixel electrode as the second electrode 12, ribs 21 as the first alignment regulating means, and slits 22 formed through the pixel electrode as the second alignment regulating means (that is, an LCD corresponding to the LCD 10A in FIG. 1A). The configuration of the LCD 10A shown in FIG. 1A is advantageous in that an increase in the number of fabrication steps can be minimized. That is, no additional step is required in forming slits through the pixel electrode. As for the counter electrode, an increase in the number of steps is smaller in placing ribs thereon than in forming slits therethrough. Naturally, the present invention is also applicable to other configurations using only ribs and only slits as the alignment regulating means.

The present inventors have found, from examinations in various ways, that the problem discussed above with reference to FIG. 20B results from the alignment division done with the first and second regulating means placed in pixels in a stripe shape, and that occurrence of this problem can be suppressed by limiting the width of liquid crystal regions defined between the adjacent first and second alignment regulating means to 14 μm or less. Hereinafter, the cause of this problem and effects of the LCD of example embodiments of the present invention will be described in detail.

Figure 2:
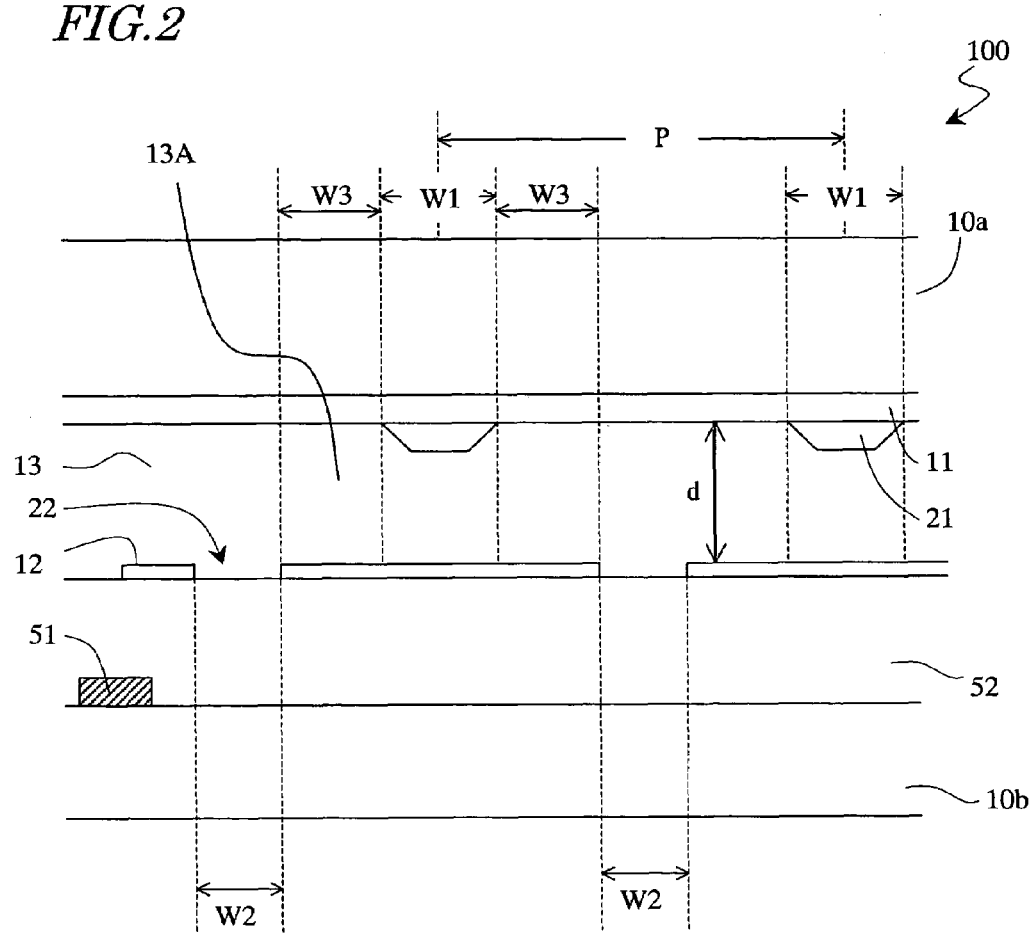
FIG. 2 is a partial cross-sectional view diagrammatically showing the sectional structure of an LCD 100 of an embodiment of the present invention.
Figure 3:
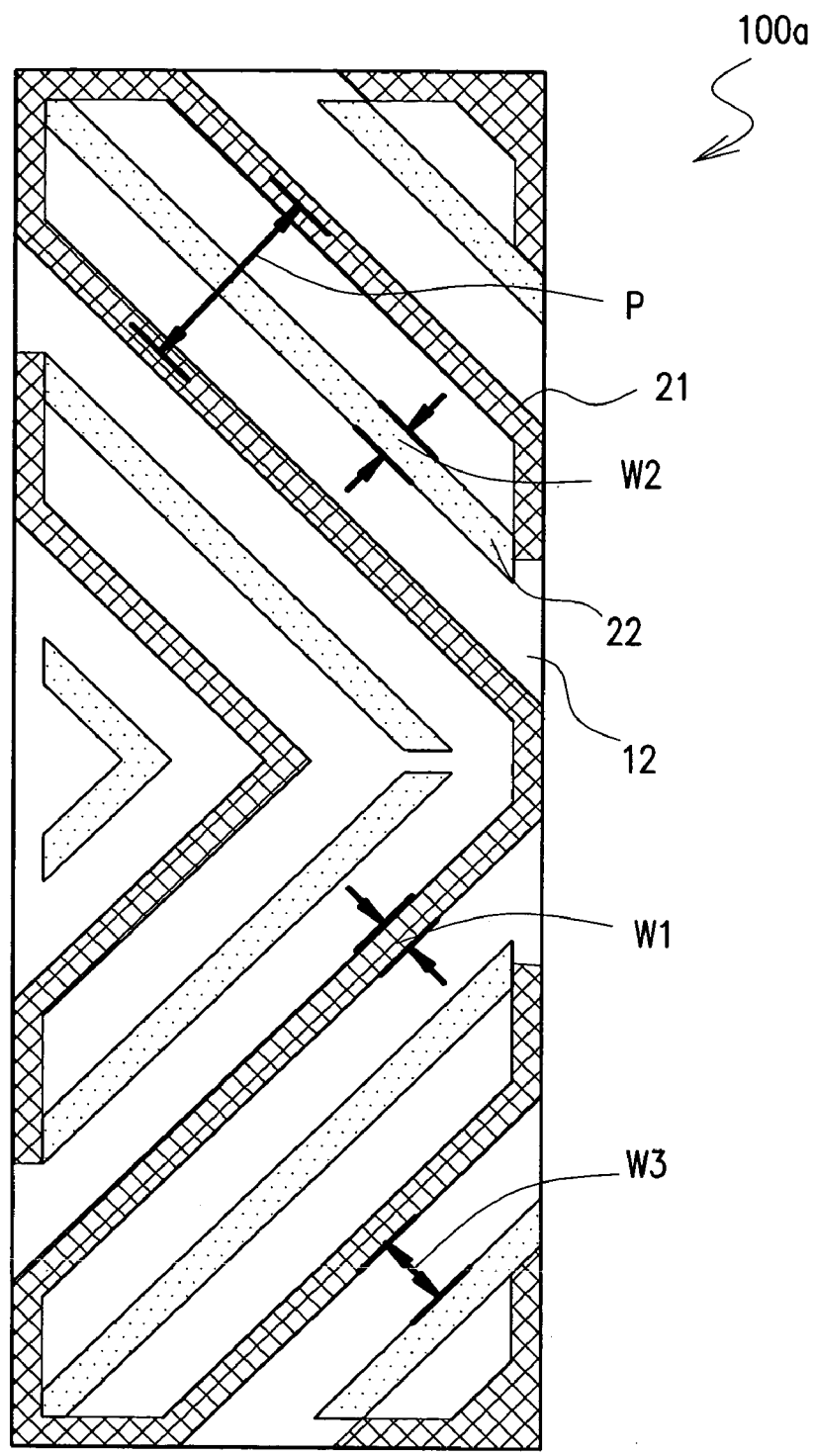
FIG. 3 is a diagrammatic plan view of a pixel portion 100a of the LCD 100.

First, the basic configuration of the LCD of the embodiment of the present invention will be described with reference to FIGS. 2 and 3. FIG. 2 is a partial cross-sectional view diagrammatically showing the sectional structure of an LCD 100, and FIG. 3 is a plan view of a pixel portion 100a of the LCD 100. The LCD 100 is substantially the same in basic configuration as the LCD 10A shown in FIG. 1A. Common components are therefore denoted by the same reference numerals.

The LCD 100 has a vertical alignment liquid crystal layer 13 between a first substrate (for example, glass substrate) 10a and a second substrate (for example, glass substrate) 10b. A counter electrode 11 is formed on the surface of the first substrate 10a facing the liquid crystal layer 13, and ribs 21 are formed on the counter electrode 11. A vertical alignment film (not shown) is formed covering substantially the entire surface of the counter electrode 11 including the ribs 21 facing the liquid crystal layer 13. The ribs 21 extend in a stripe shape as shown in FIG. 3 so that the adjacent ribs 21 are substantially in parallel with each other with a substantially uniform spacing (pitch) P therebetween. The width W1 of the ribs 21 (width in the direction orthogonal to the extension) is also uniform.

Gate bus lines (scanning lines) and source bus lines (signal lines) 51, as well as TFTs (not shown), are formed on the surface of the second substrate 10b facing the liquid crystal layer 13, and an interlayer insulating film 52 is formed to cover these components. A pixel electrode 12 is formed on the interlayer insulating film 52. The interlayer insulating film 52, which has a flat surface, is made of a transparent resin film or the like having a thickness in the range between 1.5 μm and 3.5 μm, to thereby enable overlap placement of the pixel electrodes 12 with the gate bus lines and/or the source bus lines. This is advantageous in improving the aperture ratio.

Stripe-shaped slits 22 are formed through the pixel electrode 12, and a vertical alignment film (not shown) is formed covering substantially the entire surface of the pixel electrode 12 including the slits 22. As shown in FIG. 3, the slits 22 extend in a stripe shape in parallel with each other so as to roughly bisect the spacing between the adjacent ribs 21. The width W2 of the slits 22 (width in the direction orthogonal to the extension) is substantially uniform. The shapes and arrangements of the slits and ribs described above may deviate from the respective design values in some cases due to a variation in fabrication process, misalignment in bonding of the substrates and the like. The above description does not exclude these deviations.

A stripe-shaped liquid crystal region 13A having a width W3 is defined between an adjacent stripe-shaped rib 21 and slit 22 extending in parallel with each other. In the liquid crystal region 13A, the alignment direction is regulated with the rib 21 and the slit 22 placed on both sides of the region. Such liquid crystal regions (domains) are formed on the opposite sides of each of the ribs 21 and the slits 22, in which liquid crystal molecules 13a tilt in the directions different by approximately 180° from each other. As shown in FIG. 3, in the LCD 100, the ribs 21 and the slits 22 extend in two directions different by about 90° from each other, and each pixel portion 100a has four types of liquid crystal regions 13A different in the alignment direction of liquid crystal molecules 13a by about 90° from one another. Although the arrangement of the ribs 21 and the slits 22 is not limited to the example described above, this arrangement ensures good viewing angle characteristics.

A pair of polarizing plates (not shown) are placed on the outer surfaces of the first and second substrates 10a and 10b so that the transmission axes thereof are roughly orthogonal to each other (in the crossed-Nicols state). If the polarizing plates are placed so that the transmission axes thereof form about 45° with the alignment directions of all the four types of liquid crystal layers 13A that are different by about 90° from one another, a change in retardation with the liquid crystal regions 13A can be used most efficiently. That is, the polarizing plates should preferably be placed so that the transmission axes thereof form roughly 45° with the directions of extension of the ribs 21 and the slits 22. In display devices in which observation is often moved in a direction horizontal to the display plane, such as TVs, the transmission axis of one of the polarizing plates preferably extends in a horizontal direction in the display plane for suppression of the viewing angle dependence of the display quality.

The MVA LCD 100 having the configuration described above can present a display excellent in viewing angle characteristics. When OS driving is adopted for this type of LCD, however, the phenomenon shown in FIG. 20B may occur. This phenomenon will be described in detail with reference to FIGS. 4 and 5.

Figure 4:
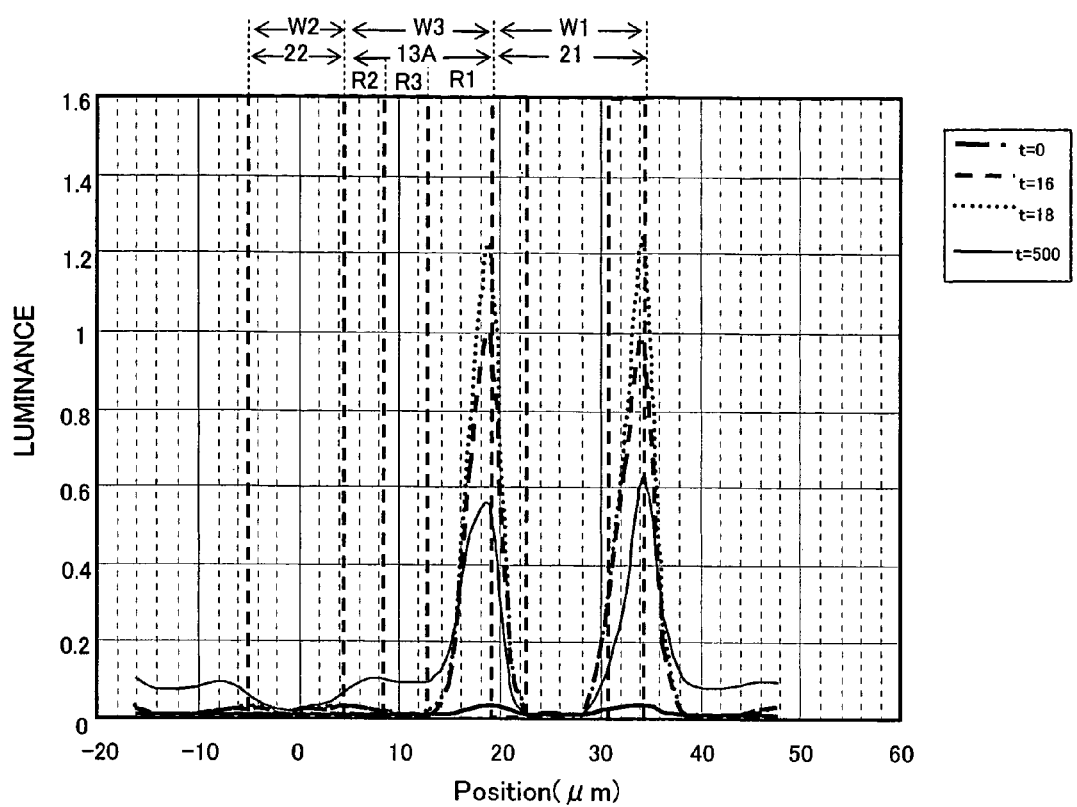
FIG. 4 is a view showing the results of measurement of changes in luminance distribution in a pixel of the LCD 100 observed when OS driving is done.

A change in luminance distribution in a pixel of the LCD 100 observed when OS driving is done was measured with a high-speed camera. FIG. 4 is a view showing the results of this measurement. Note that the measurement results at 5° C. are shown for easy understanding. The x-axis of this graph represents the position in the direction orthogonal to the extension of the ribs 21 and the slits 22, in which the center in the width direction of one of the adjacent slits 22 is determined as the origin. The luminance distribution was measured at 0 msec (V0-applied state; at this time, OSV32 is applied) and at 16 msec, 18 msec and 500 msec from/after the application of OSV32. Note that after the application of OSV32 in one vertical scanning period (one frame=16.7 msec in this example) V32 was continuously applied in the subsequent vertical scanning periods until the lapse of 500 msec from the application of OSV32. The y-axis of this graph represents the relative luminance determined with respect to the luminance of the light-shaded region as 0 and the luminance of a third LC portion R3 to be described later obtained after 500 msec as 0.1.

Specific cell parameters of the LCD 100 used in the illustrated example are as follows. The thickness d of the liquid crystal layer is 3.9 µm, the inter-rib pitch P is 53 µm, the width W1 of the ribs 21 is 16 µm (including the width of the side faces 4 µm×2), the width W2 of the slits 22 is 10 µm, and the width W3 of the liquid crystal regions 13A is 13.5 µm. The black voltage (V0) is 1.2 V, the white voltage (V255) is 7.1 V, and the voltage (V32) and the OS voltage (OSV32) for grayscale level 32 (transmittance 1.04%) are 2.44 V and 2.67V, respectively, when the γ value is 2.2. The OS voltage (OSV32) was set so that the entire pixel could give the luminance (transmittance) of grayscale level 32 in 16 msec after the black state (V0-applied state).

As is found from FIG. 4, in each liquid crystal region 13A, the luminance is high in a portion near the side face 21a of the rib 21 (this portion is called a "first LC portion R1"), and in this portion, the luminance decreases after reaching its maximum at 18 msec. On the contrary, in the remaining portion other than the first LC portion R1, the luminance monotonously increases with time, and the once-increased luminance will typically never be decreased. In each liquid crystal region 13A, also, a portion near the slit 22 (this portion is called a "second LC portion R2") is higher in response speed than the portion in the center between the rib 21 and the slit 22 (this portion is called a "third LC portion R3") because the former portion is under the influence of a tilt electric field generated near the slit 22. Thus, each stripe-shaped liquid crystal region 13A defined by the stripe-shaped rib 21 and slit 22 has three LC portions (R1, R2 and R3) different in response speed from one another.

In the LCD 100 described above, the three LC portions different in response speed from one another were provided because the first alignment regulating means (rib 21) and the second alignment regulating means (slit 22) give different degrees of influence on the response speed. If the first and second alignment regulating means give the same degree of influence, there will be provided two LC portions (R1 and R2) high in response speed roughly equally and one LC portion (R3) lower in response speed than the other portions.

Figure 5B:
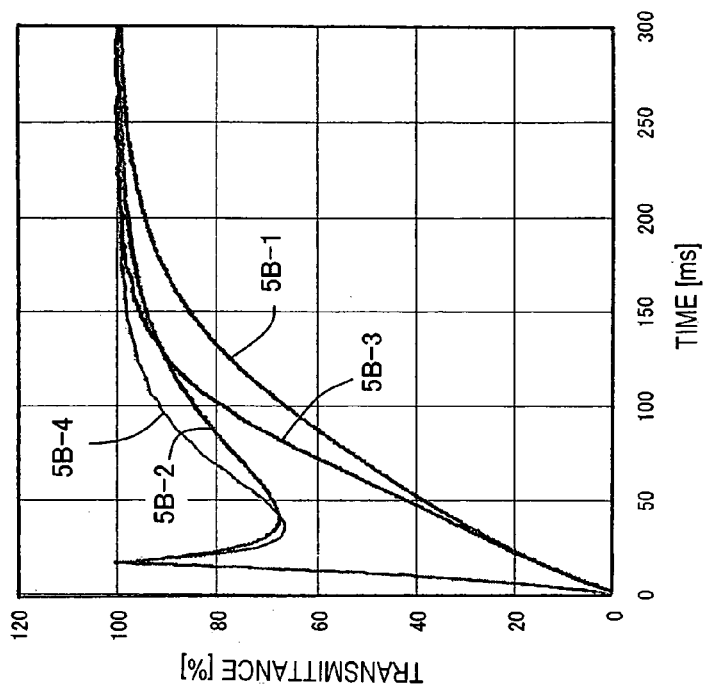
FIGS. 5A and 5B are graphs showing changes in transmittance with time observed when a MVA LCD is subjected to OS driving, measured at temperatures of 25° C. and 5° C., respectively.
Figure 5A:
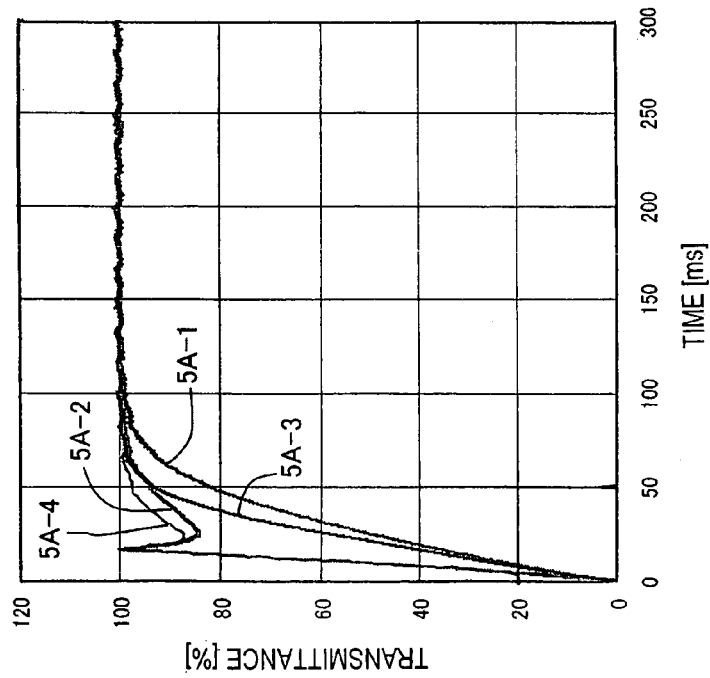

Change of the entire transmittance of the pixel portion 100a with time is then described with reference to FIGS. 5A and 5B. FIGS. 5A and 5B show the results measured at 25° C. and 5° C., respectively, in which the y-axis represents the transmittance determined with respect to the transmittance of grayscale level 0 as 0% and the transmittance of grayscale level 32 as 100%.

Curves 5A-1 and 5A-2 in FIG. 5A represent the results obtained without OS driving and with OS driving, respectively, when the thickness d of the liquid crystal layer is 3.9 µm. Curves 5A-3 and 5A-4 represent the results obtained without Os driving and with OS driving, respectively, when the cell gap is 2.8 µm. Likewise, curves 5B-1 and 5B-2 in FIG. 5B represent the results obtained without OS driving and with OS driving, respectively, when the thickness d of the liquid crystal layer is 3.9 µm. Curves 5B-3 and 5B-4 represent the results obtained without OS driving and with OS driving, respectively, when the cell gap is 2.8 µm. As the liquid crystal material for the liquid crystal layer in any of the above cases, selected was a liquid crystal material having a rotational viscosity γ1 of about 140 mPa·s and a flow viscosity ν of about 20 mm$^2$/s and giving a retardation (thickness d×birefringence Δn) of the liquid crystal layer of about 300 nm.

As is apparent from FIGS. 5A and 5B, at both temperatures of 25° C. and 5° C., the following phenomenon is observed when OS driving is done. That is, the transmittance once decreases after reaching a predetermined value (100%) within a vertical scanning period during which an OS voltage has been applied, and then gradually increase's to finally reach the predetermined value again. This phenomenon having a bottom value in the change of transmittance with time is called "horn response" in some cases.

From comparison between FIGS. 5A and 5B, it is found that the above phenomenon is more eminent at 5° C. (FIG. 5B) at which the response speed of liquid crystal molecules is low. That is, the bottom value in the change of transmittance with time is smaller (i.e., the bottom of the "horn" or trough is at a lower transmittance value) and the time required to reach the predetermined transmittance value is longer. It is also found from FIGS. 5A and 5B that as the thickness d of the liquid crystal layer is greater, the response speed is lower, that is, the time period during which the transmittance is low is longer, at both temperatures. These tendencies correspond with the results of the visual observation shown in FIG. 20B.

Figure 20A:
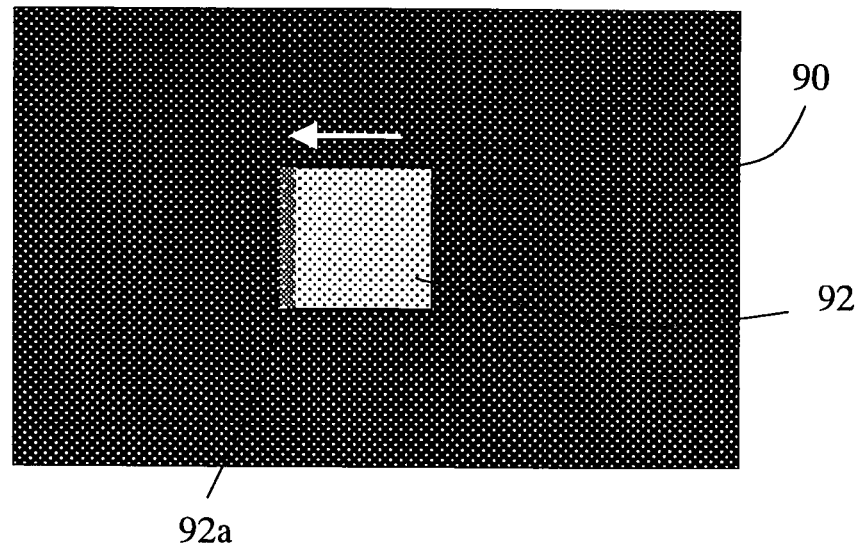
FIGS. 20A and 20B are diagrammatic views for demonstrating a problem related to moving image display in a MVA LCD.
Figure 20B:
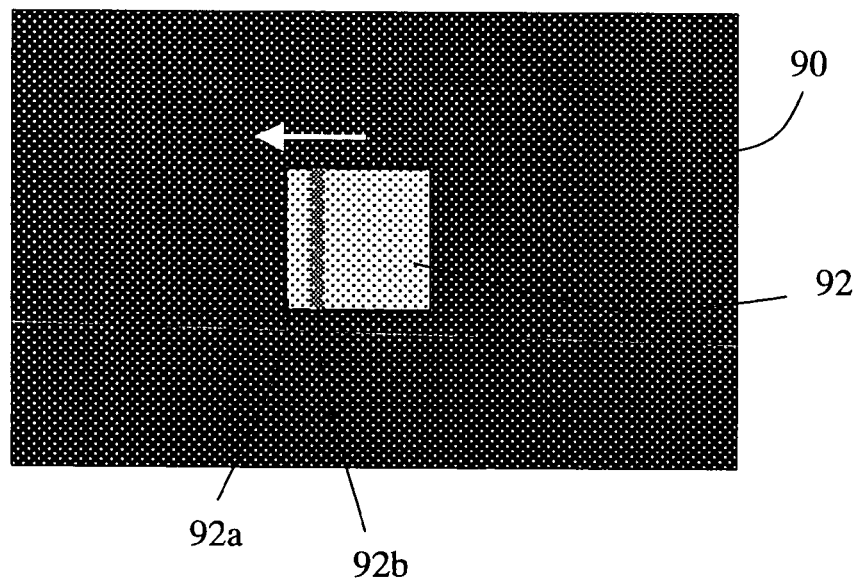

From the above, it has been recognized that the dark belt 92b shown in FIG. 20B is observed because a bottom value exists in the change of transmittance with time, and that the reason for the existence of a bottom value in the change of transmittance with time is that the response speed greatly differs among the first, second and third LC portions R1, R2 and R3 described above with reference to FIG. 4. In other words, the lower the bottom of the "horn" and the longer it takes to reach the predetermined transmittance the second time from the bottom of the horn, the more visible and prominent the belt 92b in FIG. 20B using OS driving. This phenomenon will be described in more detail with reference to FIG. 4 again.

Liquid crystal molecules in the first LC portion R1 located near the rib 21 are already in a tilted state under the influence of the side face 21a of the rib 21 when a voltage is applied, and thus the response speed of this portion is high. Once an OS voltage (OSV32), set to ensure the shift of the transmittance of the entire pixel from 0 to 32 in grayscale level within one frame period, is applied, the transmittance of the first LC portion R1 exceeds at least a transmittance value that is obtained when V32 is normally applied (transmittance value represented by the curve of t=500 msec in FIG. 4), and may even reach or be close to a transmittance value corresponding to the OS voltage (OSV32) in some cases. On the contrary, in the other portions (the second and third LC portions R2 and R3), the response speed is low, failing to reach the transmittance value corresponding to V32 within one frame period even when OSV32 is applied.

In the subsequent frame periods (t>16.7 msec) in which V32 is applied, the transmittance of the first LC portion R1 monotonously decreases to the transmittance value corresponding to V32. On the contrary, the transmittances of the second and third LC portions R2 and R3 monotonously increase to the transmittance value corresponding to V32.

Even when the transmittance of the entire pixel reaches the transmittance value corresponding to V32 within the frame period during which OSV32 is applied, this transmittance includes a component having an excessively high response speed (transmittance component exceeding the transmittance value corresponding to V32). Therefore, when the application of OSV32 is stopped and a predetermined grayscale voltage V32 is applied, the transmittance of the entire pixel temporarily decreases (e.g., see the horn or trough in FIGS. 5A-5B) because the component having an excessively high response speed decreases to the predetermined transmittance at a rate higher than the rate at which components having a low response speed (transmittance components of the second and third LC portions R2 and R3) increases. Thereafter, with increase of the components having a low response speed, the transmittance of the entire pixel increases. This explains the details of the change of transmittance with time in the pixel portion shown in FIGS. 5A and 5B.

The OS driving is also applied to TN LCDs, but the horn response described above is not observed in TN LCDs. The reason is that, in TN LCDs, the alignment division is attained by regulating the alignment directions of liquid crystal molecules in respective liquid crystal regions (domains) with alignment films rubbed in different directions. Since the alignment regulating force is given to the entirety of each liquid crystal region from a planar (two-dimensional) alignment film, no response speed distribution arises in each liquid crystal region. On the contrary, in certain example alignment-divided vertical alignment LCDs, the alignment division is made with the linear (one-dimensional) alignment regulating means provided. Therefore, portions having different response speeds are formed depending on, not only the difference in the alignment regulating force of the alignment regulating means, but also the distance from the alignment regulating means.

To find a configuration permitting suppression of the horn response characteristic (i.e., to reduce the depth and/or width of the horn or trough when using OS), that is, the occurrence of the phenomenon that the transmittance has a bottom value after application of an OS voltage described above, various MVA LCDs having the basic configuration shown in FIGS. 2 and 3 were fabricated by varying the cell parameters (the thickness d of the liquid crystal layer, the rib pitch P, the rib width W1, the slit width W2, the width W3 of the liquid crystal region, the rib height and the like), and the response characteristics of these LCDs were evaluated.

Figure 6:
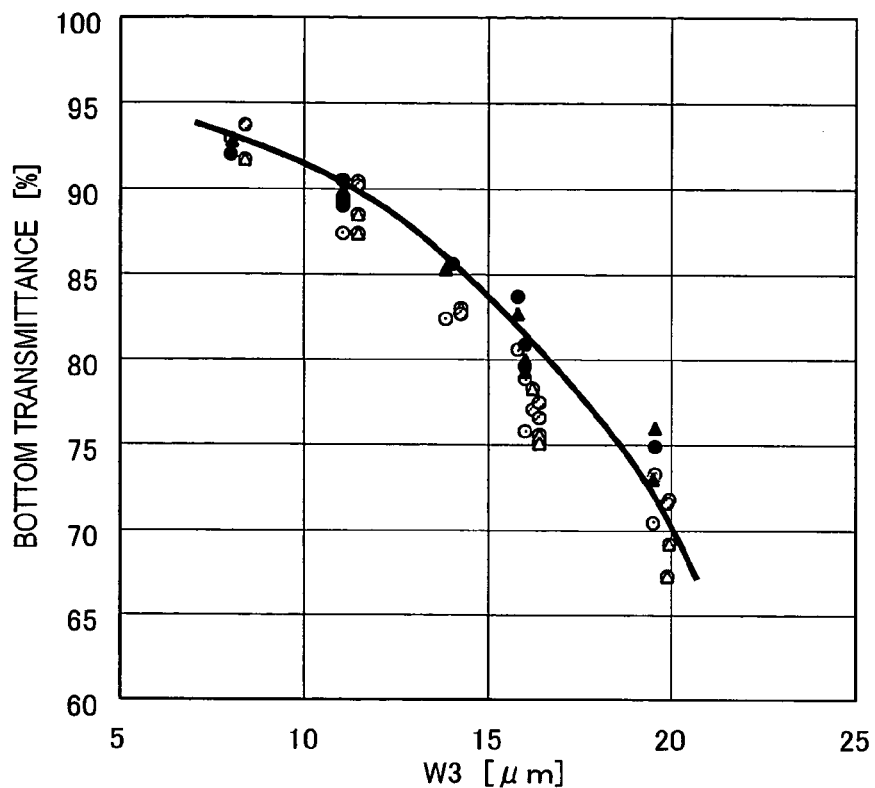
FIG. 6 is a graph showing the bottom value of the transmittance taken after application of an OS voltage, obtained as a result of measurement of changes in transmittance with time shown in FIGS. 5A and 5B, for various LCDs with different LC region widths W3.

As a result, the followings were found. It was confirmed that the response speed increased by reducing the thickness d of the liquid crystal layer as described above with reference to FIGS. 5A and 5B. It was recognized that the response speed tended to somewhat increase by increasing the rib width W1 and the slit width W2. The response speed also somewhat increased by increasing the height of the ribs. However, these effects of improving the response speed by adjusting the rib width W1, the slit width W2 and the rib height were relatively small. However, large improvement in response characteristic was attained by reducing the width W3 of the liquid crystal region (LC region width W3). FIG. 6 shows part of the above results.

FIG. 6 is a view showing the bottom value of the transmittance after application of an OS voltage (i.e., the bottom of the horn or trough), observed in the measurement of the change of transmittance with time shown in FIG. 5A, obtained by varying the LC region width W3 for six types of LCDs having cell configurations different in the thickness d of the liquid crystal layer and rib height. In this measurement, the transmittance of grayscale level 32 is determined as 100%. The bottom value of the transmittance (also called "bottom transmittance" or the bottom of the horn/trough in some cases) was roughly uniform irrespective of the thickness d of the liquid crystal layer. The rib width W1 and the slit width W2 of the LCDs used in this measurement were in the range between about 5 μm and about 20 μm, and the rib pitch P was in the range between about 25 μm and about 58 μm. The measurement results shown in FIG. 6 were obtained at 25° C.

From FIG. 6, the followings are found. First, irrespective of the six types (more types if differences in rib width W1 and slit width W2 are counted) of cell configurations, a strong correlation exists between the LC region width W3 and the bottom transmittance (i.e., depth of the bottom of the horn/trough). Secondly, the bottom transmittance increases roughly continuously or monotonously, that is, the response characteristic is improved, by reducing the LC region width W3.

From the results of FIG. 6, it is recognized that the bottom transmittance can be increased to 85% or more by reducing the LC region width W3 to about 14 μm or less, and even to 90% or more by reducing the width W3 to about 12 μm or less. The dark belt 92b shown in FIG. 20B becomes less observable when the bottom transmittance is 85% or more, and naturally, it becomes further less observable when the bottom transmittance is 90% or more.

Figure 7A:
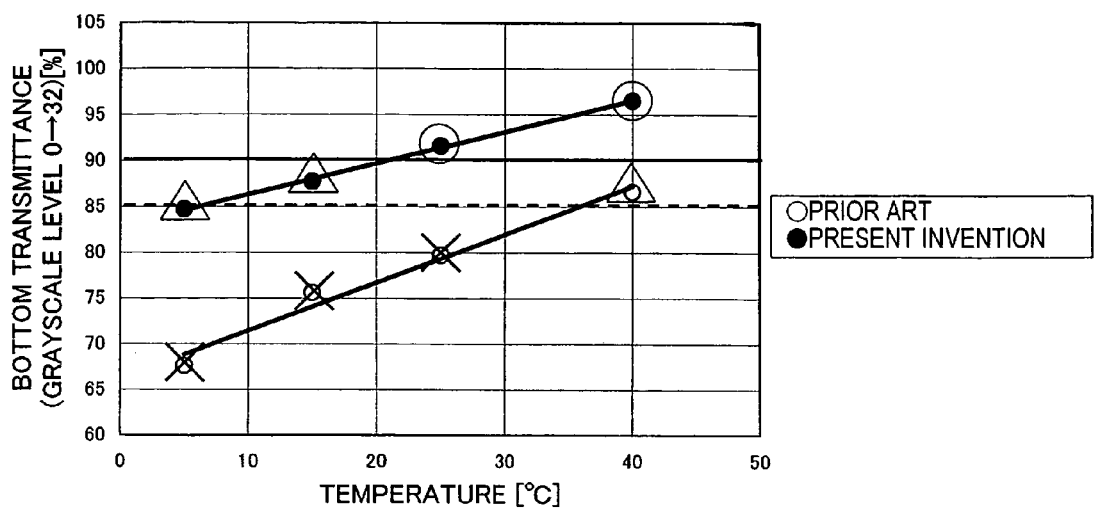
FIGS. 7A and 7B are graphs showing the results of subjective evaluation of problems caused by angular response.
Figure 7B:
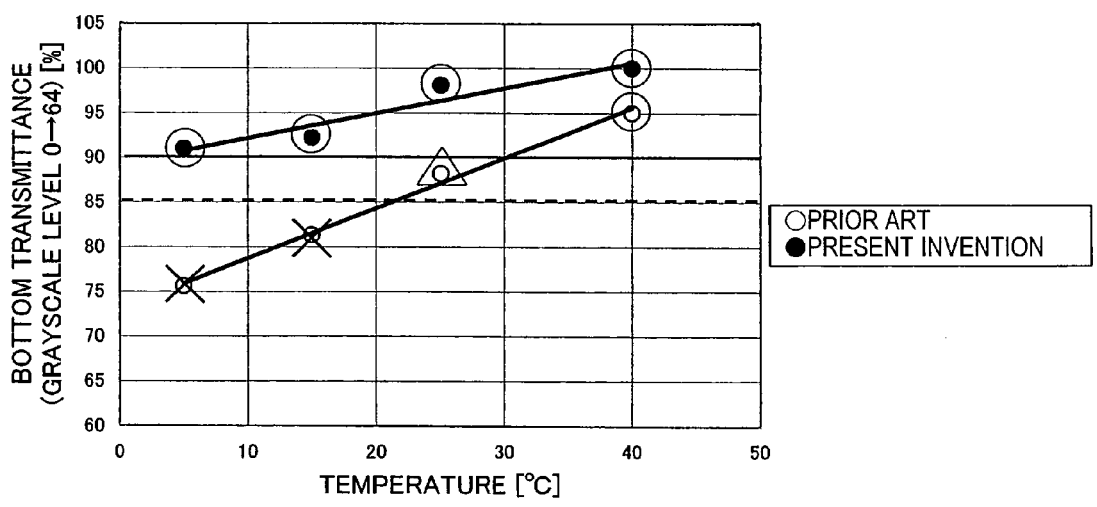

A prototype of 13-inch VGA LCD was actually fabricated, and subjective evaluation was conducted by 25 persons on the effect of improvement of the response characteristic of the LCD. The results are shown in FIGS. 7A and 7B together with those of a conventional LCD where W3 was greater than 14 μm. The 13-inch VGA LCDs (LCD of the invention and the conventional LCD) used in this evaluation are the same as LCDs that present the results shown in FIGS. 14A to 14C to be described later. The OS driving conditions are also the same as those to be described later. Hereinafter, the effect obtained by increasing the bottom transmittance to 85% or more, or 90% or more, will be described.

In the graphs shown in FIGS. 7A and 7B, the x-axis represents the temperature of the display plane of the LCD (this temperature is referred to as the "operating temperature"), and the y-axis represents the bottom transmittance given when OS driving is done. With change of the operating temperature of the LCD, the properties of the liquid crystal material such as the viscosity change, and this leads to change of the response characteristic of the LCD. The response characteristic degrades with fall of the operating temperature, and improves with rise of the operating temperature. In this measurement, the operating temperature was set at 5° C., 15° C., 25° C. and 40° C. The OS driving-caused horn response more easily occurs as the shift in display grayscale level is smaller. FIG. 7A shows the results observed when the display grayscale level is shifted from 0 to 32 (when a square of grayscale level 0 is moved in a background of grayscale level 32), and FIG. 7B shows the results observed when the display grayscale level is shifted from 0 to 64 (when a square of grayscale level 0 is moved in a background of grayscale level 64). The symbols (○, Δ, X) overlapping the points in FIGS. 7A and 7B show the results of the subjective evaluation. While a dark belt like the dark belt 92b shown in FIG. 20B is observed under the influence of horn response, the symbol ○ indicates that almost all the observers hardly visually recognized such a dark belt, the symbol Δ indicates that some observers visually recognized the dark belt but were little annoyed with this, and the symbol X indicates that almost all the observers visually recognized the dark belt.

As is found from FIGS. 7A and 7B, the results of the subjective evaluation are Δ or ○ when the bottom transmittance is 85% or more, and they are ○ when the bottom transmittance is 90% or more. In the conventional LCD where W3 is greater than 14 μm, in the case of the shift of the grayscale level from 0 to 32 (FIG. 7A), it is only when the operating temperature is 40° C. that the bottom transmittance reaches 85% or more. The bottom transmittance is only around 80% with the subjective evaluation of X at 25° C. that is a temperature generally used (room temperature). On the other hand, in the LCD of an example embodiment of the invention, in the case of the shift of the grayscale level from 0 to 32 (FIG. 7A), the bottom transmittance is 85% or more even when the operating temperature is 5° C., and it is 90% or more at an operating temperature of 25° C. or more. In the case of the shift of the grayscale level from 0 to 64 (FIG. 7B), a bottom transmittance of 90% or more can be obtained even at an operating temperature of 5° C. In other words, the bottom of the horn or trough is significantly deeper in the prior art than in embodiments of the instant invention.

As described above, the bottom transmittance can be 85% or more by setting the LC region width W3 at about 14 μm or less, or the bottom transmittance can be 90% or more by setting the LC region width W3 at about 12 μm or less. With such a bottom transmittance (i.e., higher at the bottom of the horn or trough), the resultant MVA LCD is excellent in moving image display characteristics in which a dark belt is less or hardly recognizable even when OS driving is done.

In the currently available 12 models of MVA LCDs (including the PVA LCD shown in FIG. 1C) (three manufactures, panel size: 15 to 37 inches), the LC region width W3 is in the range between about 15 μm and about 27 μm (the width W1 of the first alignment regulating means is in the range between about 7 μm and about 15 μm, and the width W2 of the second alignment regulating means is in the range between about 7 μm and about 10 μm). According to the results described above (in FIG. 6, for example), a dark belt will be observed in these LCDs if OS driving is done as in this embodiment.

The reason why the response characteristic is improved by reducing the LC region width W3 will be described with reference to FIGS. 8 and 4.

Figure 8:
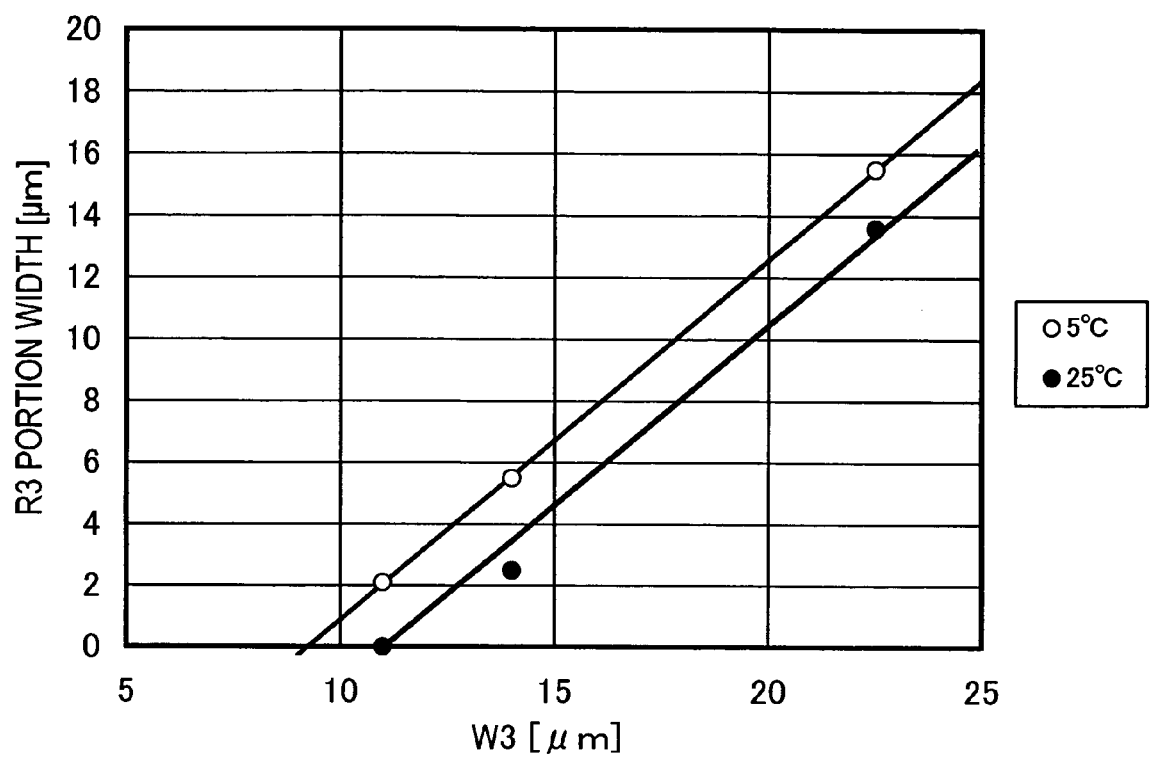
FIG. 8 is a graph showing the relationship between the LC region width W3 and the width of a third LC portion R3.

FIG. 8 is a graph showing the relationship between the LC region width W3 and the width of the third LC portion R3. As described above with reference to FIG. 4, the third LC portion R3 is a portion of the liquid crystal region 13A located apart from both the rib 21 and the slit 22 and thus lowest in response speed.

Herein, the third LC portion R3 is defined as follows to enable quantitative expression of the width of the portion R3. That is, the third LC portion R3 is a portion of the liquid crystal region in which the transmittance reached in one frame after application of an OS voltage (OSV32) with which the state of display of grayscale level 0 (black display state) is shifted to grayscale level 32 is twice or less the transmittance in the black display state. A change in transmittance distribution with time was measured as in FIG. 4 for LCDs different in LC region width W3, and the width of the third LC portion R3 determined according to the above definition was obtained for each LCD. The results were blotted as the graph of FIG. 8. FIG. 8 shows the measurement results at 25° C. and 5° C.

The graph of FIG. 8 includes two straight lines having the same inclination, indicating that the widths of the first LC portion R1 and the second LC portion R2 are constant irrespective of the LC region width W3. Thus, the relationship that R3 width=LC region width W3−R1 width−R2 width is established. The third LC portion R3 will no more substantially exist with improvement of the response characteristic of the liquid crystal region 13A. Even in this case, however, it is possible to determine the width of the third LC portion R3 as a negative value from the graph (straight line) of FIG. 8. This width of the third LC portion R3 can therefore be used as a parameter representing the response characteristic of the liquid crystal region 13A.

As is found from FIG. 8, at 25° C., the width of the third LC portion R3 is zero when the LC region width W3 is about 12 μm or less. That is, the third LC portion R3 low in response speed as described above substantially disappears. This corresponds to the LC region width W3 giving a bottom transmittance of 90% or more in FIG. 6, exhibiting good correlation therebetween.

In the results obtained at 5° C. shown in FIG. 8, the width of the third LC portion R3 is zero when the LC region width W3 is about 8 μm or less. It is therefore found that the LC region width W3 is preferably about 8 μm or less to ensure more excellent response characteristic (moving image display characteristics).

Figure 9:
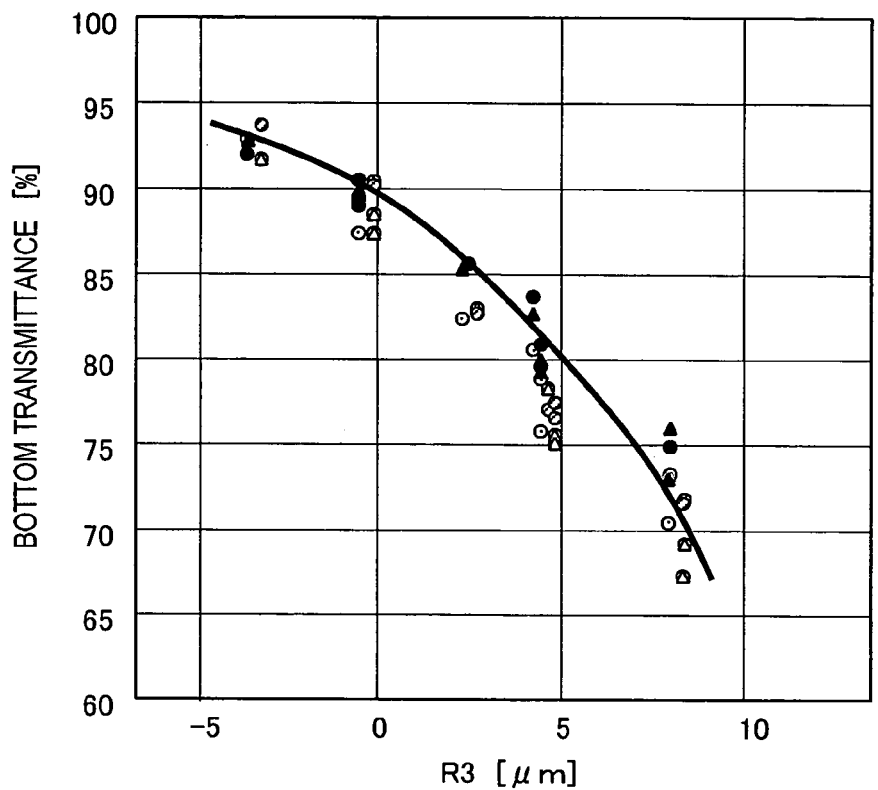
FIG. 9 is a graph re-plotting the values in the graph of FIG. 6 with respect to the width of the third LC portion R3.

FIG. 9 is a graph re-plotted from the graph of FIG. 6 with respect to the width of the third LC portion R3. As is found from FIG. 9, the bottom transmittance can be 85% or more by reducing the width of the third LC portion R3 to about 2 μm or less, or it can be 90% or more by reducing the width of R3 to about 0 μm or less.

As described above, by reducing the LC region width W3, the response characteristic can be improved, and thus the bottom transmittance in horn response (see FIGS. 5A and 5B) occurring when OS driving is done can be increased to 85% or more of a predetermined transmittance. With this improvement, the phenomenon caused by the horn response is hardly observed, and thus an LCD permitting good moving image display is provided.

It is difficult to fabricate an LCD having an LC region width W3 below 2 μm. Therefore, the LC region width W3 is preferably 2 μm or more, and also, for the same reason, the rib width W1 and the slit width W2 are preferably 4 μm or more.

The OS driving method adopted for the LCD of the invention is not specifically limited, but any known OS driving method may be adopted. Setting of the OS voltage may be made as follows, for example. While the OS voltage is set so that a predetermined transmittance is reached within one vertical scanning period in the shift of the display grayscale level every 32 levels (for example, from V0 to V32) as described above, the OS voltage to be applied in a shift of the grayscale level by less than 32 levels may be determined by interpolation using OS voltage values determined for the shift every 32 grayscale levels. The OS voltage may be changed according to the grayscale levels before and after the shift. Otherwise, as described in Literature 2 mentioned above, no OS voltage may be applied for a shift between some grayscale levels.

In this embodiment, the OS voltage value with which a predetermined transmittance was reached after one frame period was determined every 32 grayscale levels, and an OS voltage value corresponding to each shift of grayscale levels within each 32 levels was obtained by interpolation using the determined OS voltage values. Using the thus-obtained OS voltages, the MVA LCD of this embodiment having an LC region width W3 of 14 μm or less was driven. As a result, good moving image display was attained.

Next, the aperture ratio and transmittance of the MVA LCD of this embodiment will be described. As is found from FIGS. 2 and 3, reducing the LC region width W3 means lowering the aperture ratio ((pixel area—rib area—slit area)/pixel area) and thus lowering the display luminance. Therefore, if the spacing between the alignment regulating means (that is, the LC region width W3) is uniformly reduced to improve the response characteristic, the aperture ratio will decrease. To avoid this problem, in Literature 1 mentioned above (see FIG. 107, for example), for example, while the spacing between the adjacent alignment regulating means is narrowed in a certain portion of one pixel, it is made wide in the remaining portion of the pixel, to thereby achieve improvement of the response characteristic without lowering the aperture ratio. However, for the reason described above, having both narrow and wide portions as the spacing between the alignment regulating means will result in formation of portions largely different in response speed (in particular, result in increase of the area of the portion low in response speed), as described in Literature 1. This will make the problem of horn response significant.

According to the basic configuration of the LCD of the embodiment of the present invention shown in FIGS. 2 and 3, the spacing between the first and second alignment regulating means 21 and 22 (that is, the width W3 of the stripe-shaped liquid crystal region 13A) is set in the range described above, and thus occurrence of the problem of horn response can be suppressed. Also, although the liquid crystal regions 13A are uniform in width in one pixel in the illustrated example, liquid crystal regions 13A different in the width W3 may be formed in one pixel in some cases due to a cause related to the fabrication process (for example, an alignment error in the process of bonding of the substrates). In such an occurrence, however, as long as the widths W3 of respective liquid crystal regions 13A satisfy the above condition, occurrence of the problem of horn response can be suppressed.

Moreover, it was clarified from the examinations conducted in relation to certain embodiments of the present invention that the MVA LCD of this embodiment could keep its display luminance from lowering despite the reduction of the LC region width W3 from the width conventionally used. This is due to an unexpected effect that the transmittance per unit area of a pixel (hereinafter, called the "transmission efficiency") improves by reducing the LC region width W3 from the conventional width of above 15 µm. The transmission efficiency is determined by actually measuring the transmittance of a pixel and dividing the measured value by the aperture ratio. Herein, the transmission efficiency is expressed by a value somewhere between 0 and 1.

Figure 10A:
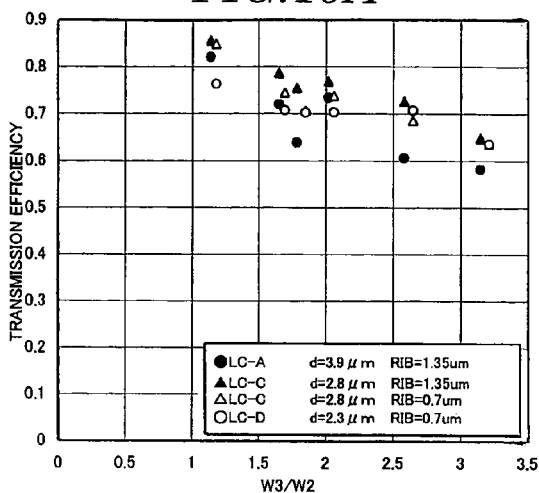
FIGS. 10A and 10B are graphs showing the results of transmittance efficiency determined for the LCDs having various cell parameters of the embodiment.
Figure 10B:
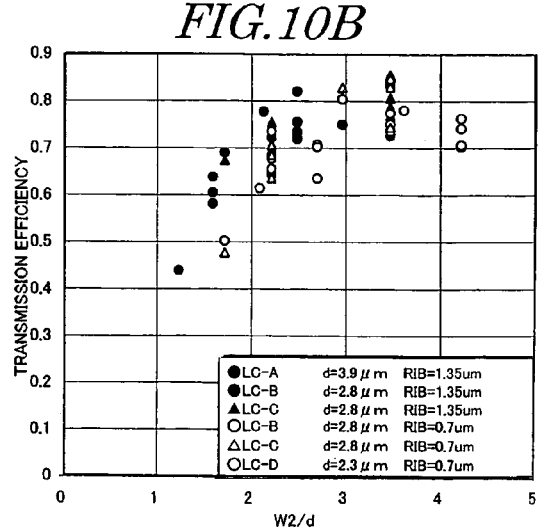
Figure 10C:
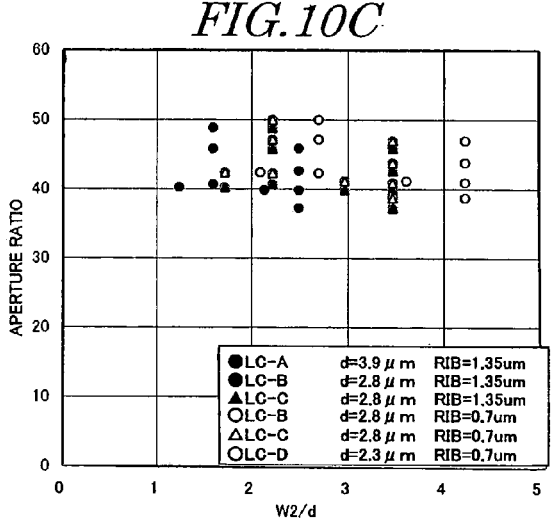
FIG. 10C is a graph showing aperture ratios of these LCDs.

The results of transmission efficiency obtained for the. LCDs of the embodiment having various cell parameters described above with reference to FIG. 6 are shown in FIGS. 10A and 10B. FIGS. 10A and 10B are graphs of which the x-axes represent (LC region width W3/slit width W2) and (slit width W2/thickness d of the liquid crystal layer), respectively. FIG. 10C shows the aperture ratios of the respective LCDs.

As is found from FIG. 10A, the transmission efficiency rather improves from that conventionally obtained (about 0.7) when (LC region width W3/slit width W2) is 1.5 or less. Also, as is found from FIG. 10B, the transmission efficiency stabilizes at values as high as about 0.7 or more when (slit width W2/thickness d of the liquid crystal layer) is about 3 or more.

Figure 11:
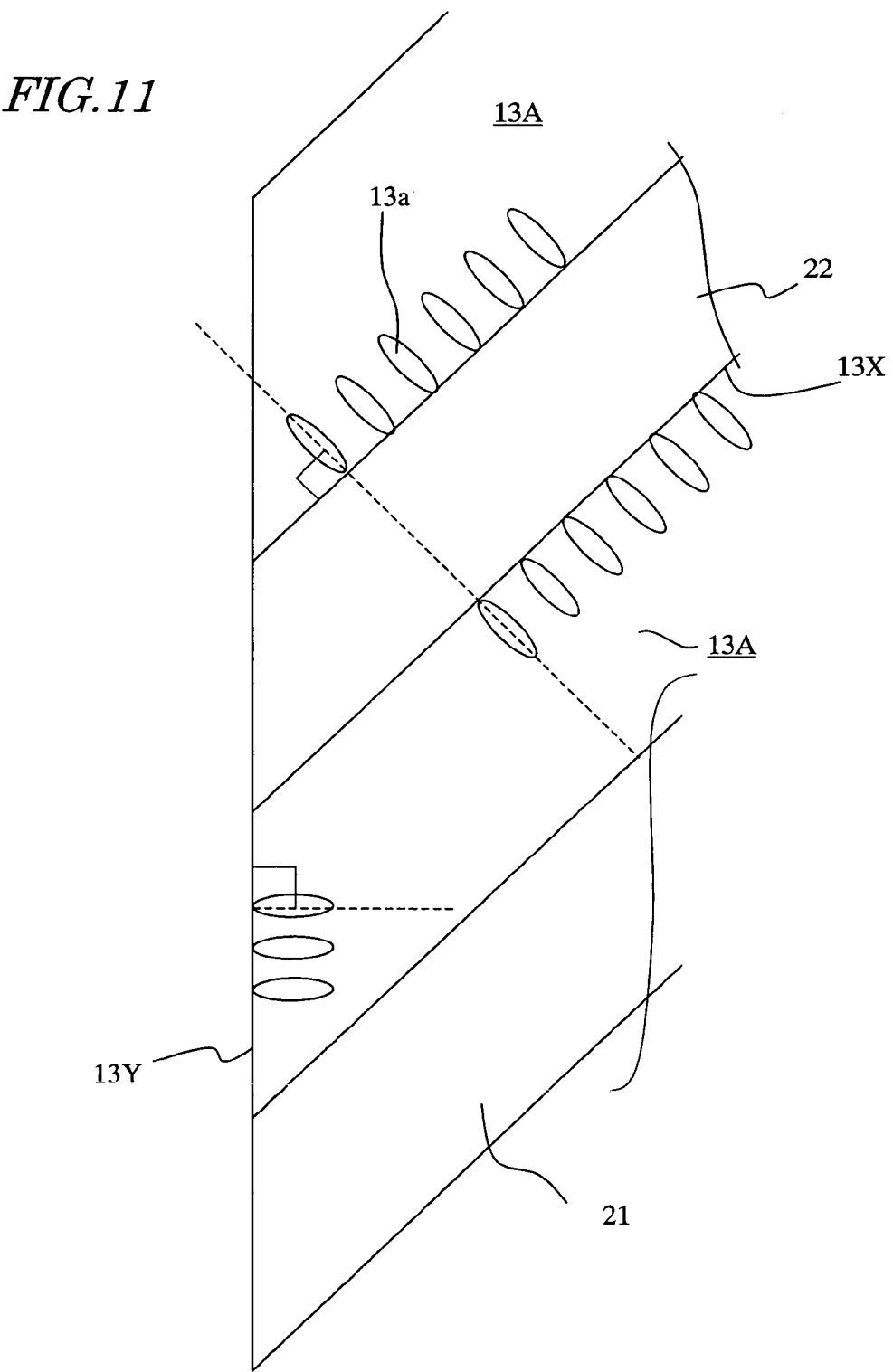
FIG. 11 is a view diagrammatically showing the alignment of liquid crystal molecules 13a in a portion of a liquid crystal region 13A near a slit 22.

The reason why the transmission efficiency improves by reducing the LC region width W3 as shown in FIG. 10A will be described with reference to FIG. 11. FIG. 11 diagrammatically shows how liquid crystal molecules 13a located near the slit 22 in the liquid crystal region 13A are aligned. Among the liquid crystal molecules 13a in the liquid crystal region 13A, those located near a side (major side) 13X of the stripe-shaped liquid crystal region 13A tilt in the plane perpendicular to the major side 13X under the influence of a tilt electric field. On the contrary, liquid crystal molecules 13a located near a side (minor side) 13Y of the liquid crystal region 13A intersecting the major side 13X tilt in a direction different from the direction of the tilt of the liquid crystal molecules 13a near the major side 13X, under the tilt electric field. In other words, the liquid crystal molecules 13a located near the minor side 13Y of the liquid crystal region 13A tilt in a direction different from a predetermined alignment direction defined by the alignment regulating force of the slit 22, acting to disturb the alignment of the liquid crystal molecules 13a in the liquid crystal region 13A. By reducing the width W3 of the liquid crystal region 13A (that is, reducing the value of (length of minor side/length of major side)), the proportion of the liquid crystal molecules 13a tilting in the predetermined direction under the influence of the alignment regulating force of the slit 22 increases in all the liquid crystal molecules 13a in the liquid crystal region 13A, resulting in increase of the transmission efficiency. In this way, by reducing the LC region width W3, obtained is the effect of stabilizing the alignment of the liquid crystal molecules 13a in the liquid crystal region 13A, and as a result, the transmission efficiency improves.

From examinations in various ways, it has been found that the effect of stabilizing the alignment (effect of improving the transmission efficiency) obtained by reducing the LC region width W3 is exhibited significantly when the thickness d of the liquid crystal layer is small, for example, as small as less than 3 µm. The reason is considered to be as follows. As the thickness d of the liquid crystal layer is smaller, the action of the tilt electric field from the slit 22 is more intense. However, at the same time, the liquid crystal layer is more influenced by the electric field from gate bus lines and source bus lines placed in the vicinity of the pixel electrode 12, or the electric field from adjacent pixel electrodes. These electric fields act to disturb the alignment of the liquid crystal molecules 13a in the liquid crystal layer 13A. Therefore, it can be said that the alignment stabilizing effect described above is exhibited significantly in the case that the thickness d of the liquid crystal layer is small in which the alignment of the liquid crystal molecules 13a tend to be disturbed.

The LCD exemplified in this embodiment includes the comparatively thick interlayer insulating film 52 covering the gate bus lines and the source bus lines, and the pixel electrode 12 is formed on the interlayer insulating film 52, as shown in FIG. 2. The influence of the interlayer insulating film 52 on the alignment of the liquid crystal molecules 13a will be described with reference to FIGS. 12A and 12B.

Figure 12A:
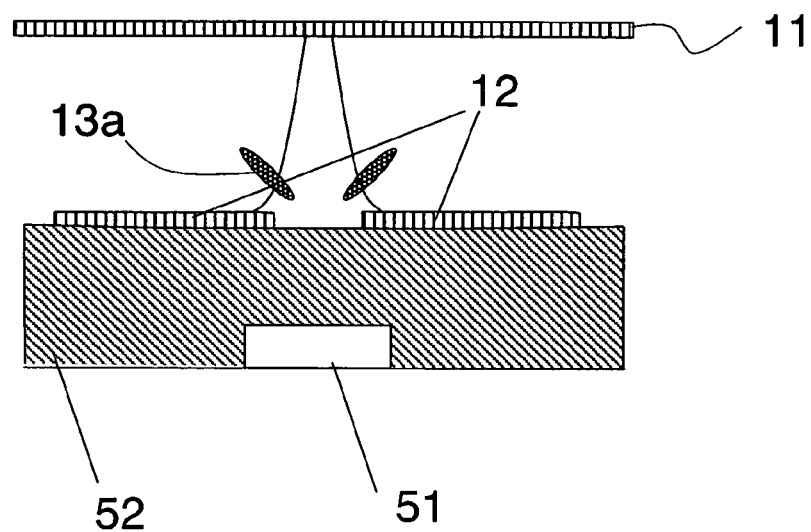
FIGS. 12A and 12B are diagrammatic views for demonstrating the influence of an interlayer insulating film of an LCD on the alignment of liquid crystal molecules.

As shown in FIG. 12A, the interlayer insulating film 52 of the LCD of this embodiment is comparatively thick (for example, the thickness is in the range between about 1.5 µm and about 3.5 µm). Therefore, even if the pixel electrode 12 and the gate bus line or the source bus line 51 overlap each other via the interlayer insulating film 52 therebetween, a capacitance formed therebetween is too small to give an undesirable significant influence on the display quality. Also, the alignment of the liquid crystal molecules 13a existing between the adjacent pixel electrodes 12 is mostly influenced by the tilt electric field generated between the counter electrode 11 and the pixel electrodes 12, as diagrammatically shown by the electric lines of force in FIG. 12A, and hardly influenced by the source bus line 51.

Figure 12B:
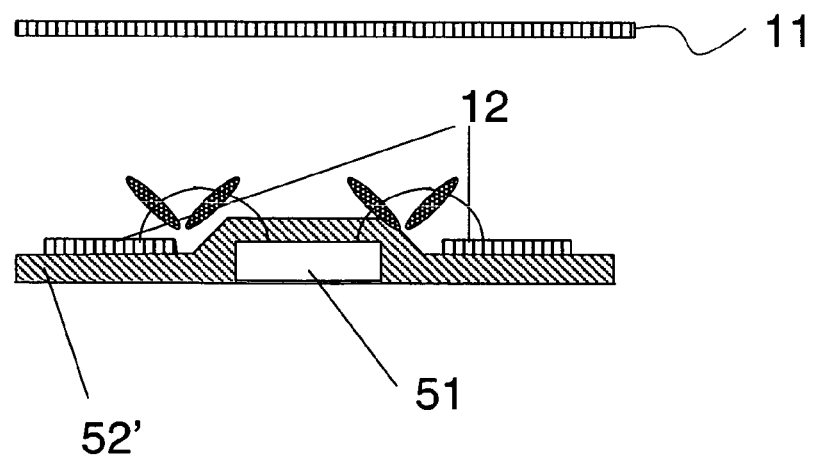

To the contrary, when a comparatively thin interlayer insulating film 52' (for example, an SiO$_2$ film having a thickness of several hundred nanometers) is formed, a comparatively large capacitance may be formed if the source bus line 51, for example, and the pixel electrode 12 overlap each other via the interlayer insulting film 52' therebetween, resulting in degradation of the display quality. To prevent this problem, as shown in FIG. 12B, arrangement may be made to avoid overlap between the pixel electrode 12 and the source bus line 51 in certain example instances where the interlayer insulating film is very thin (however, this need not be done when the interlayer insulating film(s) is of sufficient thickness to avoid such a problem). In this arrangement, the liquid crystal molecules 13a existing between the adjacent pixel electrodes 12 are largely influenced by the electric field generated between the pixel electrodes 12 and the source bus line 51, as shown by the electric lines of force in FIG. 12B, resulting in disturbance of the alignment of the liquid crystal molecules 13a located at the ends of the pixel electrodes 12.

As is apparent from comparison between FIGS. 12A and 12B, by providing the comparatively thick interlayer insulating film 52 as in the exemplified LCD of this embodiment, the liquid crystal molecules 13a are substantially free from the influence of the electric field from the gate bus lines/source bus lines, and thus can be advantageously aligned favorably in a desired direction with the alignment regulating means. In addition, since the influence of the electric field from the bus lines is minimized with the comparatively thick interlayer insulating film 52, the alignment stabilizing effect obtained by reducing the thickness of the liquid crystal layer can be exhibited significantly.

In the embodiment described above, the combination of the rib 21 and the slit 22 was used as the combination of the first and second alignment regulating means. Substantially the same effect can also be obtained by the rib-rib combination and the slit-slit combination as shown in FIGS. 1B and 1C, respectively. Alternatively, to intensify the alignment regulating force of the slit 22, an electrode having a different potential from the electrode through which the slit 22 is formed (for example, a storage capacitor electrode when the slit is formed through the pixel electrode) may be placed on the lower face of the slit 22 (face opposite to the liquid crystal layer 13).

From the standpoint of the response characteristic, the thickness d of the liquid crystal layer 13 is preferably small (see FIGS. 5A and 5B, for example). By setting the thickness d of the liquid crystal layer 13 at less than 3 μm in the LCD having the configuration described above, an MVA LCD permitting further high-definition moving image display can be provided.

The reason why the response characteristic is improved by reducing the thickness d of the liquid crystal layer 13 will be described with reference to FIGS. 13A and 13B.

Figure 13A:
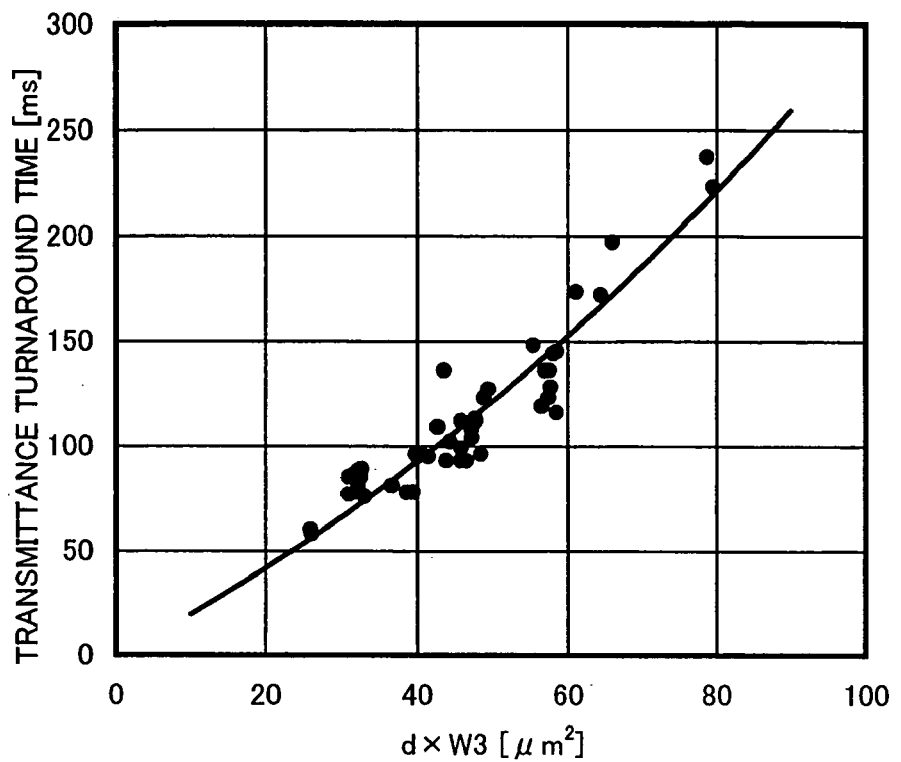
FIG. 13A is a graph showing the relationship between the product of the LC region width W3 and the thickness d of the liquid crystal layer and the transmittance turnaround time.
Figure 13B:
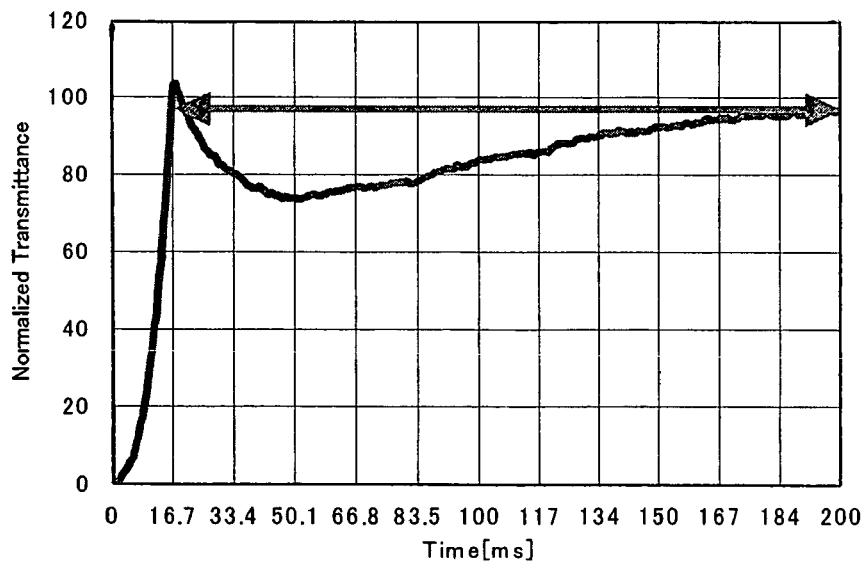
FIG. 13B is a view for definition of the transmittance turnaround time.

In the graph of FIG. 13A, the x-axis represents the product of the width W3 of the liquid crystal region 13A and the thickness d of the liquid crystal layer 13, and the y-axis represents the transmittance turnaround time. The definition of the "transmittance turnaround time" as used herein will be described with reference to FIG. 13B. As described above, in OS driving, the transmittance changes with time as diagrammatically shown in FIG. 13B. Specifically, with application of an OS voltage (at time of 0 ms), the transmittance reaches a predetermined value after one frame (e.g., at time of 16.7 ms) and then decreases to a bottom value. Thereafter, the transmittance gradually increases to be close to a value corresponding to a predetermined grayscale voltage. In this change of the transmittance, the time length from the time (16.7 ms) of the first reach to the predetermined transmittance to the time of reach to 99% of the predetermined transmittance via the bottom value is called the "turnaround time". Note that the results illustrated are those obtained when the display grayscale is shifted from 0 to 32 as an example reference.

As is found from FIG. 13A, as (d×W3) is smaller, the transmittance turnaround time is shorter, exhibiting a more excellent response characteristic. The LC region width W3 is preferably set at 14 μm or less as described above. In this case, if the thickness d of the liquid crystal layer is set at less than 3 μm, the transmittance turnaround time will be about 100 ms or less.

As described above, by setting the LC region width W3 at 14 μm or less and the thickness d of the liquid crystal layer at less than 3 μm, occurrence of the problem related to the horn response can be suppressed, and further the response characteristic can be improved. As will be appreciated by FIGS. 6 and 13, the depth of the bottom of the horn or trough can be significantly raised in a desirable manner by lowering the product of W3 and the thickness "d" of the liquid crystal layer. In certain example embodiments of this invention, the product of W3×d is less than or equal to about 42 μm$^2$, more preferably less than or equal to about 38 μm$^2$, even more preferably less than or equal to about 35 μm$^2$, still more preferably less than or equal to about 32 μm$^2$, and sometimes less than or equal to about 30 μm$^2$. As will be appreciated from FIGS. 3 and 13, this permits significantly improved viewing characteristics to be achieved.

A prototype of 13-inch VGA LCD was actually fabricated as described above, and the moving image display performance thereof was evaluated. The evaluation results are as follows. As the cell parameters, substantially the same values as those exemplified for the LCD 100 shown in FIG. 4 were used, except that the LC region width W3 was set at 10.7 μm in this case. For comparison, the characteristics of a conventional LCD of which the thickness d of the liquid crystal layer was 3.4 μm and the LC region width W3 was 15.4 μm were also evaluated.

Figure 14A:
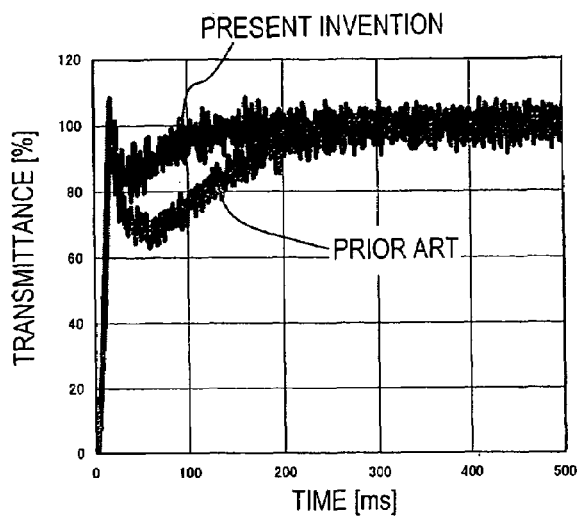
FIGS. 14A to 14C are graphs showing changes in transmittance with time observed when the LCD of an example embodiment of the present invention and a conventional LCD are subjected to OS driving.
Figure 14B:
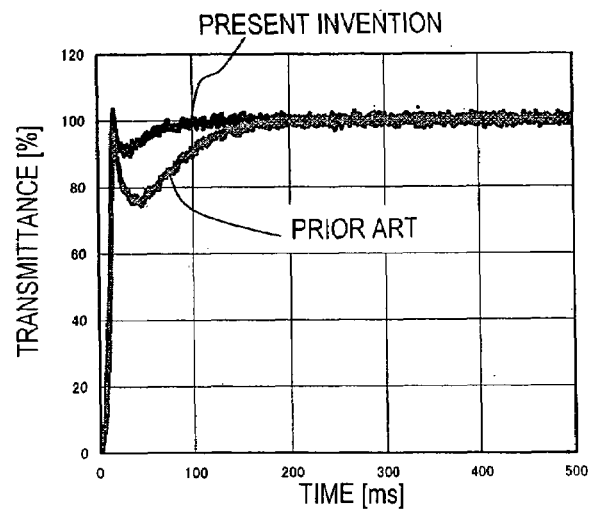
Figure 14C:
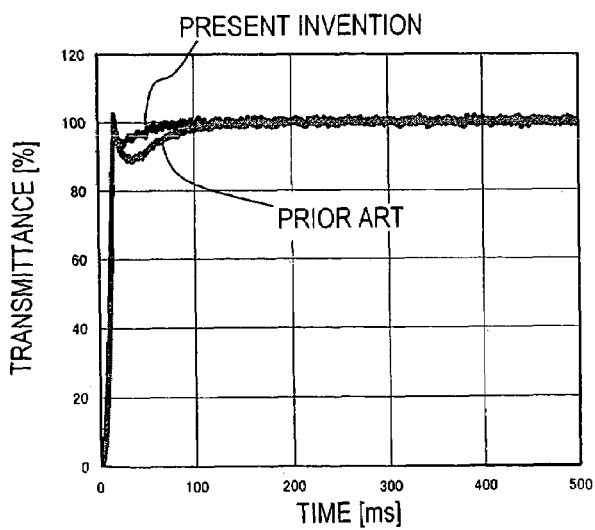

FIGS. 14A to 14C show the results of evaluation of the change with time of the entire transmittance of the pixel portion for the LCD of the invention and the conventional LCD. Specifically, FIGS. 14A to 14C show the horn response characteristic observed when the grayscale display is shifted from 0 to 32 (FIG. 14A), from 0 to 64 (FIG. 14B) and from 0 to 96 (FIG. 14C). Note that OS driving was done for both the LCD of the invention and the conventional LCD, and that the operating temperature was 5° C.

As is found from FIGS. 14A to 14C, in the LCD of the invention, in which the response characteristic has been improved, the bottom transmittance (i.e., bottom of the horn or trough) is higher than in the conventional LCD in any of the above cases, achieving 80% or more of the transmittance corresponding to a predetermined grayscale level. In addition, as a result of subjective evaluation performed in the manner described above, while a dark belt was observed when OS driving was done for the conventional LCD, a dark belt was hardly recognized when OS driving was done for the LCD of the example embodiment of this invention.

Hereinafter, the specific conditions of the OS driving and the response characteristic for the LCD of examples of the invention and the conventional LCD will be described with reference to Tables 1 to 6 below. Note that Tables 1 to 6 show the results obtained at 5° C.

In each of Tables 1 to 6, the value at the left end (start) indicates the display grayscale level in the initial state, and the values in the upper row (end) indicate the display grayscale levels after the rewrite. Herein, the case that the display grayscale level in the initial state is 0 will be described.

Figure 15:
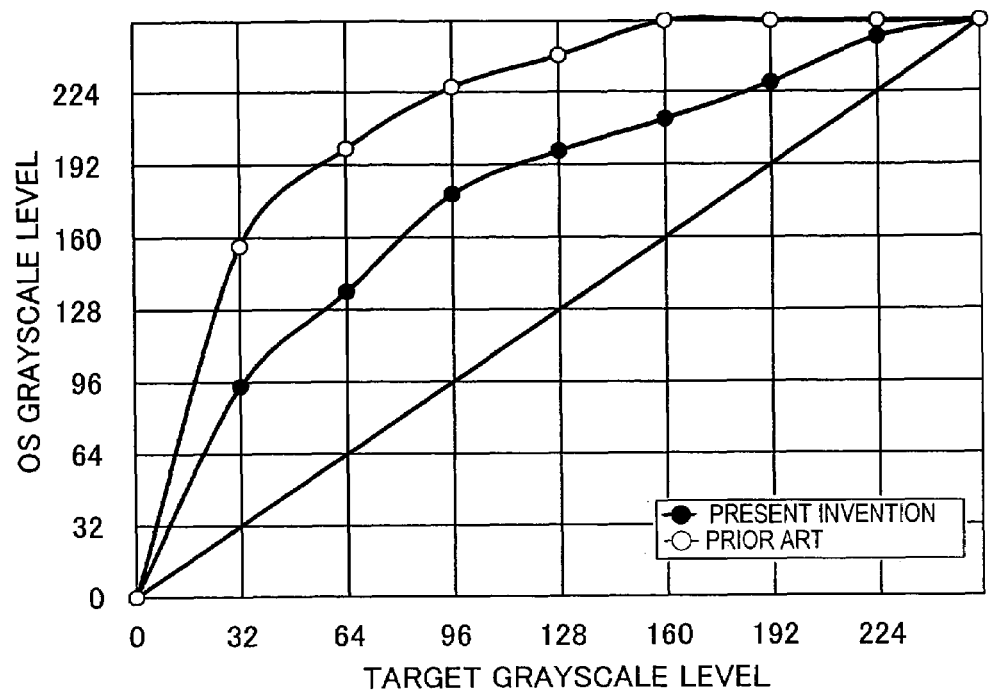
FIG. 15 is a view showing the set values of OS voltages used to obtain the changes in transmittance shown in FIG. 14.

The OS voltage values (herein indicated by the corresponding display grayscale levels) are set as shown in Table 1 for the LCD of an example of the invention and in Table 4 for the conventional LCD. For example, as shown in Table 1, for the shift of display from grayscale level 0 to 32, a voltage value corresponding to grayscale level 94 was applied as the OS voltage. As for grayscale levels that are not shown in Tables 1 and 4, a graph shown in FIG. 15 was prepared based on the relationship set in Tables 1 and 4, to obtain corresponding OS grayscale levels by interpolation.

Tables 2 and 3 show the response times required when no OS driving is done and when OS driving is done, respectively, for the LCD of an example of the invention. Likewise, Tables 5 and 6 show the response times required when no OS driving is done and when OS driving is done, respectively, for the conventional LCD. The response time used in this measurement refers to the time (unit: msec) required for a transmittance to change from 10% to 90% when the change of a predetermined transmittance in each shift in grayscale level is from 0% to 100%.

As shown in Tables 1 and 4, the OS voltage was set every 32 grayscale levels so that a predetermined grayscale level was reached within one frame period. For example, as shown in Table 1 for the LCD of an example of the invention, the OS voltage for the shift of the grayscale level from 0 to 32 (OSV32) was set at V94 (voltage corresponding to grayscale level 94). This indicates that V94 was applied in place of V32 to be applied in the normal driving. For the conventional LCD, as shown in Table 4, the OS voltage for the shift of the grayscale level from 0 to 32 (OSV32) was set at V156 (voltage corresponding to grayscale level 156). The reason why the OS voltage value is higher in the conventional LCD is that the LCD of the example of the invention is more excellent in response characteristic (shorter in response time) as is apparent from comparison between Tables 2 and 5. From these tables, also, it is proved that the configuration described above improves the response characteristic.

As is found from the response time shown in Table 2, in the LCD of the example of the invention, the response time tends to be longer than one frame period (16.7 msec) in display of low grayscale levels when no OS driving is done. With OS driving, however, the response time can be made shorter than one frame period for all the grayscale levels as shown in Table 3. In addition, the problem of horn response does not occur as described above. On the contrary, when OS driving is done for the conventional LCD, the response time is greatly improved as shown in Table 6, but is still longer than one frame period in some cases, and moreover the problem of horn response occurs as described above.

TABLE 1

| OS amount | | | | end | | | | |
|---|---|---|---|---|---|---|---|---|
| 0 | 32 | 64 | 96 | 128 | 160 | 192 | 224 | 255 |
| 0 | 0 | 94 | 136 | 179 | 198 | 212 | 228 | 248 | 255 |

TABLE 2

| (Without OS, 10-90%) | | | | end | | | | |
|---|---|---|---|---|---|---|---|---|
| 0 | 32 | 64 | 96 | 128 | 160 | 192 | 224 | 255 |
| 0 | | 99.5 | 69.6 | 57.5 | 43.5 | 34.8 | 27.1 | 16.6 | 15.5 |

TABLE 3

| (With OS, 10-90%) | | | | end | | | | |
|---|---|---|---|---|---|---|---|---|
| 0 | 32 | 64 | 96 | 128 | 160 | 192 | 224 | 255 |
| 0 | | 11.5 | 10.3 | 10.6 | 10.2 | 10.3 | 10.0 | 8.3 | 15.5 |

TABLE 4

| OS amount | | | | end | | | | |
|---|---|---|---|---|---|---|---|---|
| 0 | 32 | 64 | 96 | 128 | 160 | 192 | 224 | 255 |
| 0 | 0 | 156 | 199 | 226 | 240 | 255 | 255 | 255 | 255 |

TABLE 5

| (Without OS, 10-90%) | | | | end | | | | |
|---|---|---|---|---|---|---|---|---|
| 0 | 32 | 64 | 96 | 128 | 160 | 192 | 224 | 255 |
| 0 | | 212.7 | 43.6 | 94.9 | 69.3 | 48.7 | 35.4 | 26.1 | 28.1 |

TABLE 6

| (With OS, 10-90%) | | | | end | | | | |
|---|---|---|---|---|---|---|---|---|
| 0 | 32 | 64 | 96 | 128 | 160 | 192 | 224 | 255 |
| 0 | | 11.6 | 9.4 | 9.0 | 9.4 | 14.5 | 29.2 | 33.8 | 28.1 |

As described above, the LCD of an example embodiment of the invention exhibits excellent moving image display characteristics by adopting OS driving. Therefore, with further provision of a circuit for receiving television broadcast, the LCD can be suitably used as an LCD TV permitting high-definition moving image display. To attain the OS driving, known methods may be broadly adopted. A drive circuit adapted to apply an OS voltage higher than a grayscale voltage determined in advance to correspond to a predetermined grayscale level (or possibly apply the grayscale voltage) may further be provided. Otherwise, the OS driving may be executed by software.

In the above embodiment, the example of the present invention was described as adopting OS driving. There is also a case that a voltage is applied in a similar way (for example, the display signal voltage is applied in the order of V0→V94→V32) although no OS driving is adopted. In such a case, also, the effect of the present invention can be obtained.

Examples of the present invention are applicable, not only to the MVA LCD described above, but also to other alignment-divided vertical alignment LCDs in which the alignment of the liquid crystal layer is divided, not with a planar (two-dimensional) alignment film, but with linear (one-dimensional) alignment regulating means (slits and/or ribs), that is, the aligned state and response speed of liquid crystal molecules vary with the distance from the alignment regulating means. For example, the present invention is also applicable to a continuous pinwheel alignment (CPA) LCD shown in FIG. 16.

Figure 16:
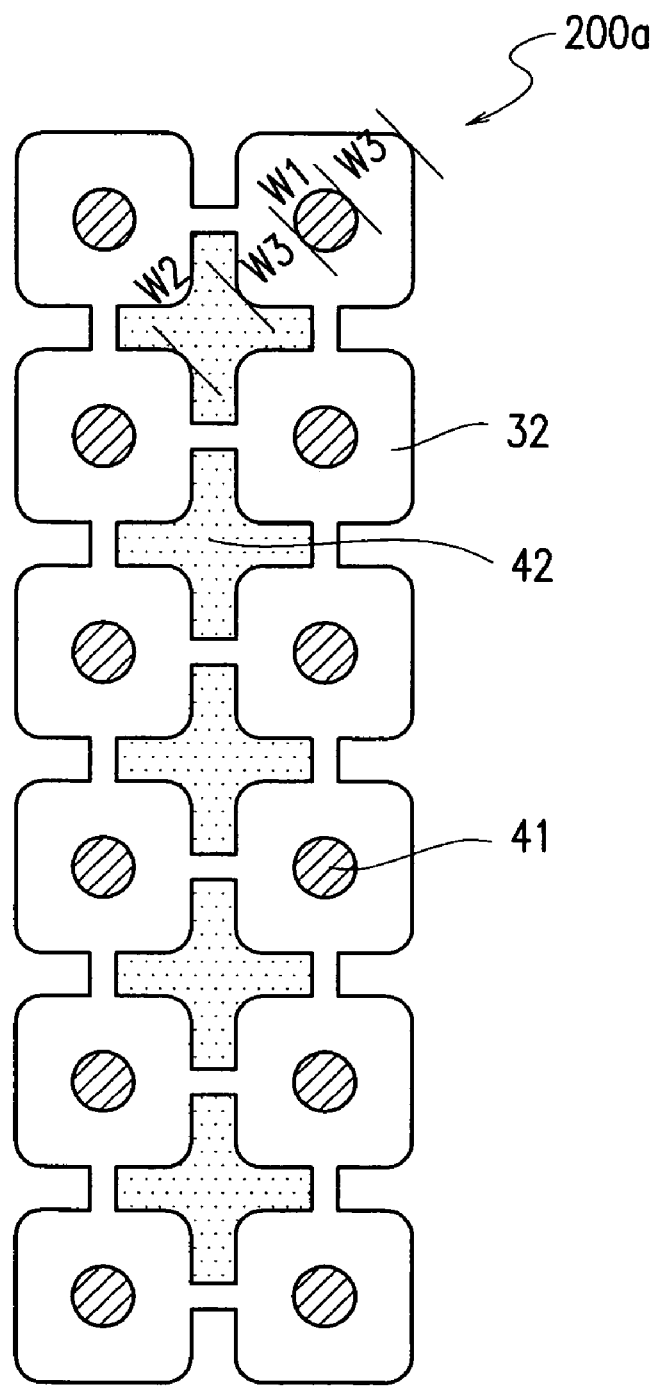
FIG. 16 is a plan view diagrammatically showing a pixel configuration of an LCD of another embodiment of the present invention.

In the CPA LCD having a pixel 200a shown in FIG. 16, the alignment of the liquid crystal layer is divided with a pixel electrode 32 (solid portion, a portion in which a conductive layer actually exists), openings 42 formed through the pixel electrode 32, and ribs (or protrusions) 41 placed on a counter electrode (not shown) facing the pixel electrode 32 via a vertical alignment liquid crystal layer therebetween. In the CPA LCD, the vertical alignment liquid crystal layer is divided to give continuously changing alignment directions around each rib or protrusion 41. The ribs or protrusions 41 correspond to the first alignment regulating means, and the openings or apertures 42 correspond to the second alignment regulating means. The outer edges of the pixel electrode 32 have a shape permitting generation of a tilt electric field as do the openings 42.

In the CPA LCD described above, as shown in FIG. 16, the width of the rib 41 corresponds to the width W1 of the first alignment regulating means, the width of the opening 42 corresponds to the width W2 of the second alignment regulating means, and the region between the rib 41 and the opening 42 above the pixel electrode 32 is defined as the liquid crystal region having the width W3. By setting these widths to satisfy the conditions described in the above embodiments, substantially the same effect as that obtained by the MVA LCD described above can be obtained. Note that in the CPA LCD, in which the shapes and widths of the alignment regulating means (ribs and openings) vary with the direction, the setting to satisfy the above conditions may be done in the direction in which the width W3 of the liquid crystal region is maximum.

In the examples described above, in both the MVA LCD and the CPA LCD, the sides of the first alignment regulating means (for example, ribs) and the second alignment regulating means (for example, slits) in contact with the liquid crystal region defined by these means are straight lines or curved lines as viewed from top (in the direction normal to the display plane). The shape of the sides is not limited to these, and other shapes may instead be used in different embodiments of this invention.

Figure 17:
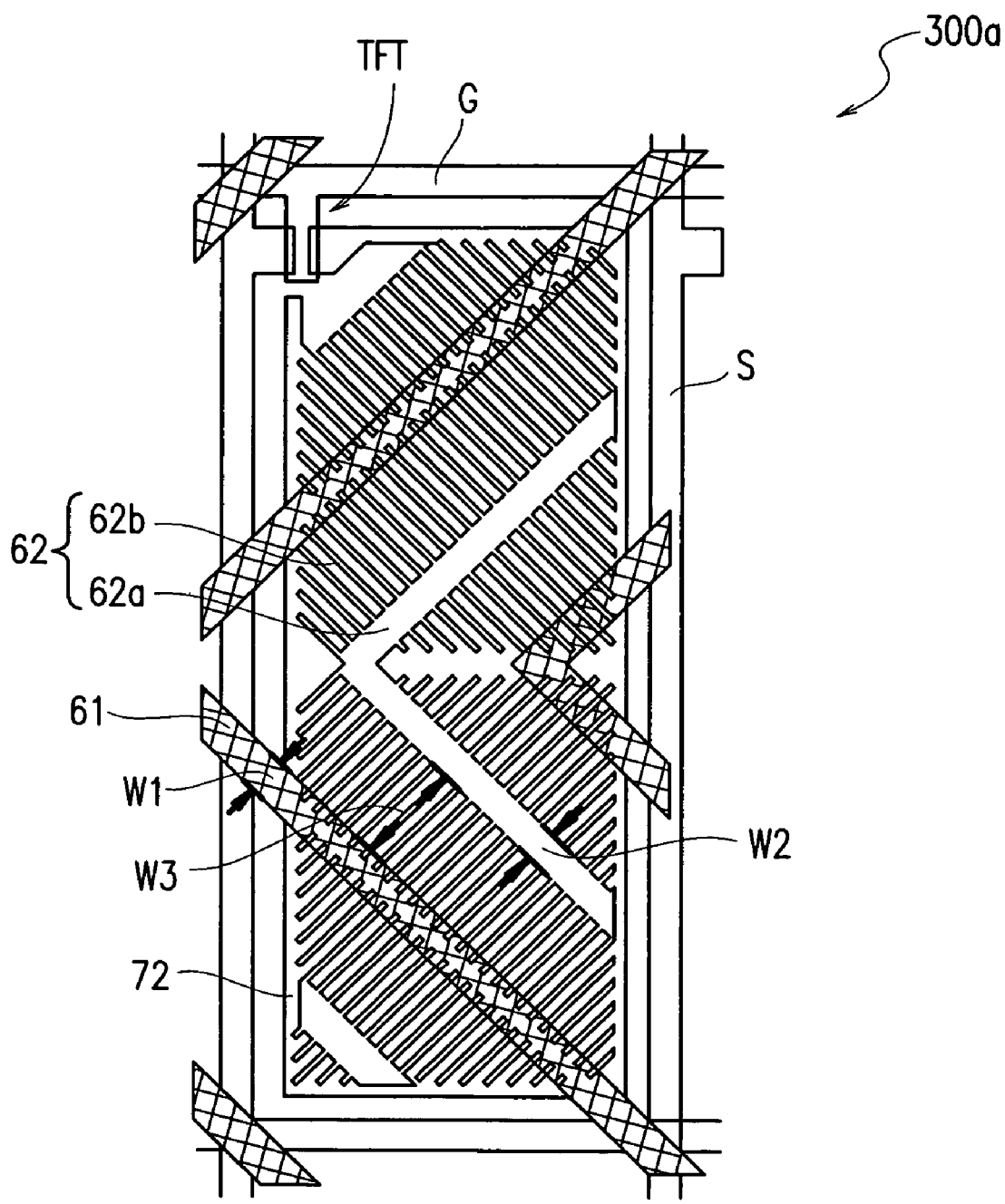
FIG. 17 is a plan view diagrammatically showing a pixel configuration of an LCD of yet another embodiment of the present invention.

For example, as an MVA LCD shown in FIG. 17, alignment regulating means having a comb shape as viewed from top may be used. In the MVA LCD having a pixel 300a shown in FIG. 17, the alignment of the liquid crystal layer is divided with a pixel electrode 72, openings 62 formed through the pixel electrode 72, and ribs (or protrusions) 61 placed on a counter electrode (not shown) facing the pixel electrode 72 via a vertical alignment liquid crystal layer therebetween. The ribs 61 have a stripe shape having a constant width W1 as in the MVA LCD of the embodiment described above. Each opening or slit 62 includes a stripe-shaped trunk 62a and branches 62b extending in the direction orthogonal to the extension of the trunk 62a. The stripe-shaped ribs 61 and the stripe-shaped trunks 62a are placed in parallel with each other, defining liquid crystal regions having a width W3 therebetween. The branches 62b of the openings 62 extend in the direction of the width of the liquid crystal regions, and thus each opening 62 has a comb shape as a whole as viewed from top. As described in Japanese Laid-Open Patent Publication No. 2002-107730, with the comb-shaped openings 62, the proportion of liquid crystal molecules exposed to a tilt electric field increases, and thus the response characteristic can be improved. However, since the distribution of the response speed of liquid crystal molecules is uniquely influenced by the distance between the rib 61 and the opening 62, the third LC portion low in response speed described above is formed between the opening 62 and the trunk 62a of the opening 62 irrespective of the existence of the branches 62b of the opening 62.

Accordingly, in the MVA LCD having the pixel 300a, also, the effect described above can be obtained by setting the widths W1, W2 and W3 as in the LCD of the embodiments described above. This also applies to the CPA LCD shown in FIG. 16.

In the above description on the configuration (in particular, the LC region width W3) of the alignment-divided vertical alignment LCD exhibiting excellent moving image display performance when OS driving was adopted, no mention was made on influence of the black voltage. The black or OFF state voltage was actually set at 1.2 V as a typical example in the graph of FIG. 6, for example, which shows the dependence of the bottom transmittance on the LC region width W3.

Figure 18:
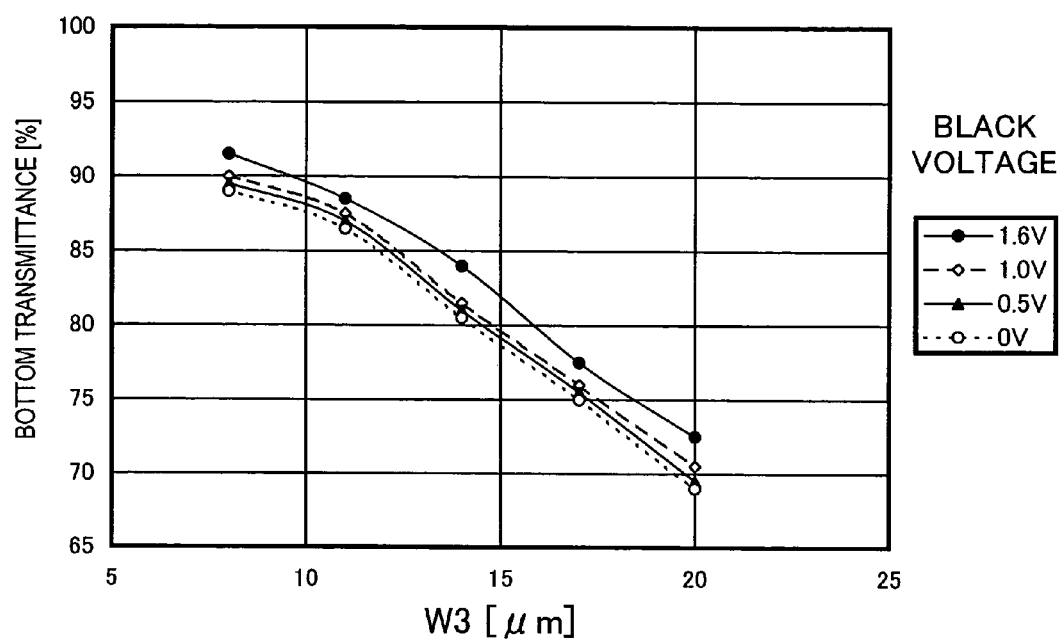
FIG. 18 is a graph showing the bottom value of the transmittance taken after application of an OS voltage (V32) for various LCDs different in LC region width W3, in which the bottom value varies with the black voltage.
Figure 19:
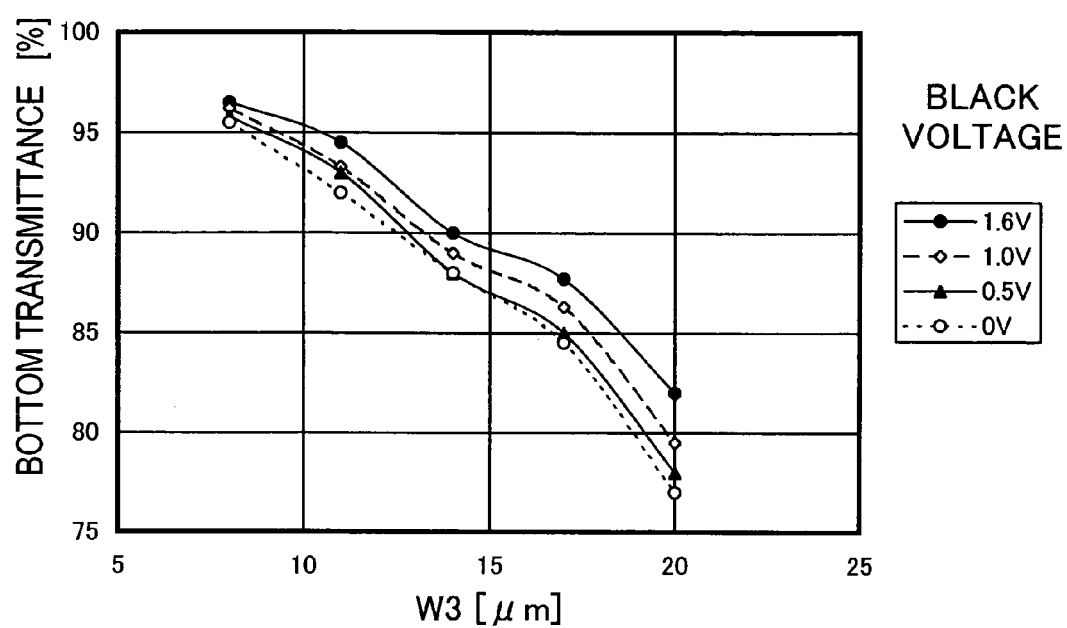
FIG. 19 is a graph showing the bottom value of the transmittance taken after application of an OS voltage (V64) for various LCDs different in LC region width W3, in which the bottom value varies with the black voltage.

Hereinafter, the influence of the black voltage on the dependence of the bottom transmittance on the LC region width W3 will be described with reference to FIGS. 18 and 19. The cell parameters of LCDs used in this case are as shown in Table 7. Note that the measurement results in FIGS. 18 and 19 were obtained at 25° C. (panel surface temperature). The white voltage was 7.6V for all LCDs. FIG. 18 shows the bottom transmittance observed after application of an OS voltage at the shift of display from grayscale level 0 to 32, in the percentage with respect to the transmittance in grayscale level 32 as 100%. FIG. 19 shows the bottom transmittance observed after application of an OS voltage at the shift of display from grayscale level 0 to 64, in the percentage with respect to the transmittance in grayscale level 64 as 100%. As the liquid crystal material for the liquid crystal layer in any of the LCDs, selected was a liquid crystal material having a rotational viscosity $\gamma 1$ of about 133 mPa·s and a flow viscosity $\nu$ of about 19 mm$^2$/s and giving a retardation (thickness d×birefringence $\Delta$n) of the liquid crystal layer of about 300 nm.

TABLE 7

| LC region width W3 (μm) | rib pitch P (μm) | rib width W1 (μm) | slit width W2 (μm) | rib height (μm) | LC layer thickness d (μm) |
|---|---|---|---|---|---|
| 20 | 58 | 8 | 10 | 0.7 | 2.8 |
| 17 | 52 | 8 | 10 | 0.7 | 2.9 |
| 14 | 46 | 8 | 10 | 0.7 | 2.8 |
| 11 | 40 | 8 | 10 | 0.7 | 2.8 |
| 8 | 34 | 8 | 10 | 0.7 | 2.9 |

As is found from FIGS. 18 and 19, as the black voltage is higher, the bottom transmittance is higher for all values of the LC region width W3. To improve the moving image display performance, therefore, the black voltage should preferably be set high. The reason for this tendency is that with a higher black voltage, the alignment regulating force generated with a tilt electric field is more intense, and this increases the angle of tilt of liquid crystal molecules. As is easily understood from this, the transmittance becomes higher with a higher black voltage. From this standpoint, therefore, the black voltage should preferably be low to attain a high contrast ratio. The contrast ratios of the LCD having the LC region width W3 of 11 μm with the black voltage of 0V, 0.5V, 1.0V, and 1.6V were 657, 613, 573, and 539 in this order.

In FIG. 18, by setting the LC region width W3 at 14 μm or less, a bottom transmittance of 80% or more can be secured even when the black voltage is 0 V. Likewise, in FIG. 19, a bottom transmittance exceeding 85% can be secured. Furthermore, by setting the LC region width W3 at 12 μm or less, a bottom transmittance of about 85% or more can be secured in FIG. 18, and a bottom transmittance of 90% or more can be secured in FIG. 19.

As described above, in the embodiment of the present invention, which provides a configuration exhibiting excellent moving image display performance, the moving image display performance can be equal to or higher than the conventional one even when the black voltage is set lower than conventionally set. In other words, the contrast ratio can be improved without sacrificing the moving image display performance. Note that the moving image display performance and the contrast ratio may be appropriately optimized because the levels thereof required vary depending on the use of the LCD.

Thus, according to certain example embodiments of the present invention, the response characteristic of alignment-divided vertical alignment LCDs having a large viewing angle characteristic, such as MVA LCDs and CPA LCDs is improved, and thus LCDs permitting high-definition moving image display are provided. In particular, OS driving can be adopted for alignment-divided vertical alignment LCDs without occurrence of significant degradation in display quality due to horn response, and thus LCDs permitting high-definition moving image display are provided. The LCDs of the present invention find various applications such as TVs, monitors, and the like.

While the present invention has been described in preferred embodiments, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

This non-provisional application claims priority under 35 USC § 119(a) on Patent Application No. 2003-279083 filed in Japan on Jul. 24, 2004 and Patent Application No. 2004-205103 filed in Japan on Jul. 12, 2004, the entire contents of which are hereby incorporated by reference.

What is claimed is:

1. A liquid crystal display device having a plurality of pixels each having a first electrode, a second electrode facing the first electrode, and a vertical alignment liquid crystal layer placed between the first and second electrodes, the device comprising:
    first alignment regulating means having a first width located at the first electrode side of the liquid crystal layer;
    second alignment regulating means having a second width located at the second electrode side of the liquid crystal layer;
    a liquid crystal region having a third width defined between the first alignment regulating means and the second alignment regulating means,
    wherein the third width is in a range between 2 μm and 14 μm, and
    wherein at least one of the regulating means comprises at least one slit in at least one of the electrodes, and wherein a ratio of the third width (W3) to a width of the slit (SW) is W3/SW <1.5, and a ratio of SW/d>=3, where d is a thickness of the liquid crystal layer.

2. The liquid crystal display device of claim 1, wherein the first alignment regulating means is in a stripe shape having the first width, the second alignment regulating means is in a stripe shape having the second width, and the liquid crystal region is in a stripe shape having the third width.

3. The liquid crystal display device of claim 1, wherein the third width is 12 μm or less.

4. The liquid crystal display device of claim 3, wherein the third width is 8 μm or less.

5. The liquid crystal display device of claim 1, wherein the first alignment regulating means is a rib and/or protrusion, and the second alignment regulating means is a slit formed through the second electrode.

6. The liquid crystal display device of claim 5, wherein the first width is in a range between 4 μm and 20 μm, and the second width is in a range between 4 μm and 20 μm.

7. The liquid crystal display device of claim 1, wherein the first electrode is a counter electrode, and the second electrode is a pixel electrode.

8. The liquid crystal display device of claim 1, wherein the thickness of the liquid crystal layer is less than 3 μm.

9. A liquid crystal display device of claim 1, wherein the device has a pair of polarizing plates placed to face each other with the liquid crystal layer therebetween, transmission axes of the pair of polarizing plates are orthogonal to each other, one of the transmission axes extends in a horizontal direction in the display plane, and the first and second alignment regulating means are placed to extend in a direction about 45° from the one of the transmission axes.

10. A liquid crystal display device of claim 1, further comprising a drive circuit capable of applying an overshoot voltage higher than a grayscale voltage determined in advance to correspond to a predetermined grayscale.

11. A driving method for the liquid crystal display device of claim 1, comprising the step of applying an overshoot voltage in display of a given grayscale level higher than a grayscale level displayed in the preceding vertical scanning period, the overshoot voltage being higher than a predetermined grayscale voltage corresponding to the given grayscale level.

12. The driving method of claim 11, wherein the overshoot voltage is set so that the display luminance reaches a predetermined value corresponding to the given grayscale level within a time corresponding to one vertical scanning period.

13. Electronic equipment comprising the liquid crystal display device of claim 1.

14. The electronic equipment of claim 13, further comprising a circuit for receiving television broadcast.

15. The liquid crystal display device of claim 1, wherein a product of the third width multiplied by a thickness "d" of the liquid crystal layer is less than or equal to 42 μm².

16. The liquid crystal display device of claim 1, wherein the product of the third width multiplied by the thickness "d" of the liquid crystal layer is less than or equal to 38 μm².

17. The liquid crystal display device of claim 1, wherein the product of the third width multiplied by the thickness "d" of the liquid crystal layer is less than or equal to 35 μm².

18. The liquid crystal display device of claim 1, wherein the product of the third width multiplied by the thickness "d" of the liquid crystal layer is less than or equal to 32 μm².

19. The liquid crystal display device of claim 1,
    wherein an overshoot (OS) driving technique is used so that when a reference gray scale value of 32 is desired and an OS driving technique is used, in an area of the display where this gray scale value of 32 is desired transmittance initially reaches a first transmittance value which is approximately the gray scale value of 32, then decreases to a second transmittance value lower than the first value, and then gradually increases back up to approximately the first transmittance value which is substantially the gray scale value of 32 thereby forming a horn or trough in a transmission curve; and
    wherein a thickness of the liquid crystal layer and the third width are of respective values so that the transmittance value at the bottom of the horn or trough is at least 85% of the first value.

20. The liquid crystal display device of claim 19, wherein the thickness of the liquid crystal layer and the third width are of respective values so that the transmittance value at the bottom of the horn or trough is at least 90% of the first value.

21. The liquid crystal display device of claim 19, wherein the thickness of the liquid crystal layer and the third width are of respective values so that the transmittance value at the bottom of the horn or trough is at least 92% of the first value.

22. The liquid crystal display device of claim 19, wherein the thickness of the liquid crystal layer and the third width are of respective values so that the transmittance value at the bottom of the horn or trough is at least 94% of the first value.

23. A liquid crystal display device having a plurality of pixels each having a first electrode, a second electrode facing the first electrode, and a vertical alignment liquid crystal layer placed between the first and second electrodes, the device comprising:
   stripe-shaped first alignment regulating means having a first width placed in the first electrode side of the liquid crystal layer;
   stripe-shaped second alignment regulating means having a second width placed in the second electrode side of the liquid crystal layer;
   a stripe-shaped liquid crystal region having a third width defined between the first alignment regulating means and the second alignment regulating means, and
   wherein the third width is in a range between 2 µm and 14 µm, and the thickness of the liquid crystal layer is less than 3 µm, and
   wherein at least one of the regulating means comprises at least one slit in at least one of the electrodes, and wherein a ratio of the third width (W3) to a width of the slit (SW) is W3/SW <1.5, and a ratio of SW/d>=3, where d is a thickness of the liquid crystal layer.

24. A liquid crystal display device comprising:
   a plurality of pixels each having a first electrode, a second electrode facing the first electrode, and a vertical alignment liquid crystal layer between the first and second electrodes,
   wherein, in the vertical alignment liquid crystal layer, a majority of liquid crystal molecules are aligned in a substantially vertical state in an off state;
   first alignment regulating means having a first width located on one side of the liquid crystal layer;
   second alignment regulating means having a second width located on a second side of the liquid crystal layer;
   a liquid crystal region having a third width defined between the first alignment regulating means and the second alignment regulating means; and
   wherein a product of the third width multiplied by a thickness "d" of the liquid crystal layer is less than or equal to 42 µm$^2$, and
   wherein at least one of the regulating means comprises at least one slit in at least one of the electrodes, and wherein a ratio of the third width (W3) to a width of the slit (SW) is W3/SW <1.5, and a ratio of SW/d>=3, where d is a thickness of the liquid crystal layer.

25. The liquid crystal display device of claim 24, wherein the product of the third width multiplied by the thickness "d" of the liquid crystal layer is less than or equal to 35 µm$^2$.

26. The liquid crystal display device of claim 24, wherein the third width is less than 14 µm.

27. The liquid crystal display device of claim 24, wherein an overshoot (OS) driving technique is used so that when a reference gray scale value of 32 is desired and an OS driving technique is used, in an area of the display where this gray scale value of 32 is desired transmittance initially reaches a first transmittance value which is approximately the gray scale value of 32, then decreases to a second transmittance value lower than the first value, and then gradually increases back up to approximately the first transmittance value which is substantially the gray scale value of 32 thereby forming a horn or trough in a transmission curve; and
   wherein a thickness of the liquid crystal layer and the third width are of respective values so that the transmittance value at the bottom of the horn or trough is at least 85% of the first value.

* * * * *